US009786207B2

(12) United States Patent
Kim et al.

(10) Patent No.: US 9,786,207 B2
(45) Date of Patent: Oct. 10, 2017

(54) FOLDABLE DISPLAY APPARATUS

(71) Applicant: LG Display Co., Ltd., Seoul (KR)

(72) Inventors: JunHyung Kim, Seoul (KR); TaeWoo Kim, Paju-si (KR); MiJin Han, Ansan-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/220,283

(22) Filed: Jul. 26, 2016

(65) Prior Publication Data

US 2017/0061836 A1   Mar. 2, 2017

(30) Foreign Application Priority Data

Aug. 31, 2015   (KR) .......................... 10-2015-0123275

(51) Int. Cl.
| | | |
|---|---|---|
| *G09F 9/30* | (2006.01) | |
| *G06F 1/16* | (2006.01) | |
| *E05D 11/00* | (2006.01) | |
| *H04M 1/02* | (2006.01) | |

(52) U.S. Cl.
CPC ............ *G09F 9/301* (2013.01); *G06F 1/1652* (2013.01); *E05D 11/0054* (2013.01); *G06F 1/1616* (2013.01); *G06F 1/1681* (2013.01); *H04M 1/0216* (2013.01)

(58) Field of Classification Search
CPC .... G06F 1/1681; G06F 1/1652; G06F 1/1616; G06F 9/301; H04M 1/0216; E05D 3/06; E05D 11/0054
See application file for complete search history.

(56) References Cited

U.S. PATENT DOCUMENTS

| | | | | |
|---|---|---|---|---|
| 9,243,432 B2 * | 1/2016 | Lee | ........................... | E05D 3/06 |
| 9,471,111 B2 * | 10/2016 | Huang | ...................... | E05D 7/06 |
| 9,562,380 B2 * | 2/2017 | Song | ........................ | E05D 1/00 |
| 9,625,954 B2 * | 4/2017 | Campbell | ............. | G06F 1/1681 |

(Continued)

FOREIGN PATENT DOCUMENTS

| | | |
|---|---|---|
| CN | 103106845 | 5/2013 |
| TW | 201417068 | 5/2014 |
| TW | M497803 | 3/2015 |

OTHER PUBLICATIONS

Office Action for Taiwan Patent Application No. TW 10620551920, May 23, 2017, 12 Pages (With English Translation).

*Primary Examiner* — Adrian S Wilson
*Assistant Examiner* — Abhishek Rathod
(74) *Attorney, Agent, or Firm* — Fenwick & West LLP

(57) ABSTRACT

Embodiments relate to a foldable display apparatus including a hinge providing supporting for a bending area of a flexible display panel. The flexible display panel includes a first flat display area and a second flat display area at both sides of a bending display area. A first rear cover provides support for the first flat display area and has a first edge. A second rear cover provides support for the second flat display area and has having a second edge facing the first edge and parallel to the first edge. The hinge includes rear hinge covers longitudinally extending parallel to the first edge and the second edge, and elastic axis members coupling the plurality of rear hinge covers in an interlocking and rotatable manner. The elastic axis members are deformed as the rear hinge covers make a relative movement by bending of the hinge.

22 Claims, 16 Drawing Sheets

(56) References Cited

U.S. PATENT DOCUMENTS

| | | | |
|---|---|---|---|
| 2007/0117600 A1* | 5/2007 | Robertson, Jr. | H04M 1/0216 455/575.3 |
| 2009/0126155 A1* | 5/2009 | Nieuwenhuizen | H04M 1/0216 16/302 |
| 2010/0232100 A1* | 9/2010 | Fukuma | F16G 13/18 361/679.01 |
| 2011/0043976 A1 | 2/2011 | Visser et al. | |
| 2011/0148797 A1 | 6/2011 | Huitema et al. | |
| 2012/0307423 A1* | 12/2012 | Bohn | G06F 1/1641 361/679.01 |
| 2013/0037228 A1 | 2/2013 | Verschoor et al. | |
| 2013/0219663 A1* | 8/2013 | Cai | G06F 1/1681 16/371 |
| 2014/0126133 A1* | 5/2014 | Griffin | G06F 1/1652 361/679.27 |
| 2015/0055287 A1* | 2/2015 | Seo | G06F 1/1652 361/679.27 |
| 2015/0077917 A1* | 3/2015 | Song | G06F 1/1681 361/679.27 |
| 2015/0131222 A1* | 5/2015 | Kauhaniemi | G06F 1/1652 361/679.27 |
| 2016/0187935 A1* | 6/2016 | Tazbaz | G06F 1/1681 361/679.03 |

* cited by examiner

VII-VII'

FOLDABLE DISPLAY APPARATUS

CROSS REFERENCE TO RELATED APPLICATION

This application claims the benefit of Republic of Korea Patent Application No. 10-2015-0123275 filed on Aug. 31, 2015, which is hereby incorporated by reference as if fully set forth herein.

BACKGROUND

Field of the Disclosure

Embodiments of the present invention relate to a foldable display apparatus, and more particularly, to a foldable display apparatus which is bent with a predetermined curvature or unfolded into a flat state.

Discussion of the Related Art

Generally, display devices using flat display panels such as liquid crystal display device, plasma display device, organic light emitting display device, electrophoretic display device and electro-wetting display device are applied to notebook computers, portable electronic devices, televisions or monitors.

With the increasing demand for a large-sized screen in the portable electronic devices, an apparatus with a large-sized display area using a flat display panel has been developed and commercialized. Especially, a foldable display apparatus or rollable display apparatus using advantages of a flexible display panel capable of being bent or fold, which allows ease of portability and large-sized display area, has been attracted great attentions as a next generation technology. The foldable display apparatus may be applied in various fields of television and monitor as well as mobile devices of mobile communication terminal, electronic notebook, electronic book, PMP (portable multimedia player), navigation, UMPC (ultra mobile PC), mobile phone, smart phone and tablet PC (personal computer).

In a conventional foldable display apparatus, when a pair of supporters is rotated, a flexible display panel is folded by a detachment of an adhesive member attached to the supporter so that it is possible to reduce a bending stress occurring when the flexible display panel is folded.

However, if the flexible display panel of the related art foldable display apparatus is repetitively folded and unfolded, the flexible display panel may become bent for a process of attaching the flexible display panel to the supporter by the use of adhesiveness of the adhesive member or detaching the flexible display panel from the supporter, thereby lowering reliability of the flexible display panel.

SUMMARY

Embodiments relate to a foldable display apparatus including a flexible display panel, a first rear cover, a second rear cover, and a hinge. The flexible display panel includes a first flat display area, a second flat display area and a bending display area between the first flat display area and the second flat display area. The first rear cover provides support for the first flat display area and has a first edge. The second rear cover provides support for the second flat display area and has a second edge facing the first edge in an unfolded state of the foldable display apparatus. The hinge is between the first rear cover and the second rear cover. The hinge supports the bending display area and includes a plurality of rear hinge members and a plurality of elastic axis members. The rear hinge members are between the first edge and the second edge. The rear hinge covers interlock with each other in the unfolded state and is rotated around each other from the unfolded state into a folded state. The elastic axis members couple the plurality of rear hinge covers, the first edge and the second edge. The elastic axis members are deformed as the rear hinge members are rotated around each other by bending of the flexible display panel.

In one embodiment, deformation of the elastic axis members in the folded state of the foldable display apparatus is greater than deformation of the elastic axis members in the unfolded state.

In one embodiment, the rear hinge members include a first rear hinge member, a second rear hinge member, and a third rear hinge member. The first rear hinge member is coupled to the first edge via a first elastic axis member of the plurality of elastic axis members. The second rear hinge member is coupled to the second edge via a second elastic axis member of the plurality of elastic axis members. The third rear hinge member is coupled between the first rear hinge member and the second rear hinge member.

In one embodiment, the first rear hinge member includes first inner connection protrusions with holes for receiving the first axis member and the first edge comprises first cover protrusions with holes for receiving the first elastic axis member. The second rear hinge member includes second inner connection protrusions with holes for receiving the second axis member and the second edge comprises second cover protrusions with holes for receiving the second elastic axis member.

In one embodiment, the foldable display apparatus further includes a fourth rear hinge member and a fifth rear hinge member. The fourth rear hinge member is coupled to the third rear hinge member via a third elastic axis member of the plurality of elastic axis members. The fourth rear hinge member is coupled to the first rear hinge member via the fourth elastic axis member. The fifth rear hinge member is coupled to the third rear hinge member via a fifth elastic member. The fifth rear hinge member is coupled to the second rear hinge member via a sixth elastic axis member.

In one embodiment, each of a subset of the plurality of the rear hinge members includes a first supporting bar and a first rotation axis portion. The first supporting bar extends parallel to the first edge or the second edge and has an upper surface providing support for a portion of the bending display area. The first rotation axis portion has a first inner portion protrusion inserted into first protrusion insertion space in another rear hinge member as the hinge is unbent. The first inner portion protrusion is retracted from the first protrusion insertion space as the hinge is bent.

In one embodiment, each of the subset of the plurality of the rear hinge members includes a second supporting bar and a second rotation axis portion. The second supporting bar extends parallel to the first edge or the second edge. The second rotation axis portion is at an opposite longitudinal side of the first rotation axis portion. The second rotation axis portion has a second inner portion protrusion inserted into second protrusion insertion space in the other rear hinge member as the hinge is unbent. The second inner portion protrusion is retracted from the second protrusion insertion space as the hinge is bent.

In one embodiment, each of the subset of the rear hinge member includes outer connection protrusions with holes for receiving one of the elastic axis members, and inner connection protrusions with holes for receiving another of the elastic axis members.

In one embodiment, an inner connection protrusion of one of the rear hinge members is placed between (i) two of a plurality of cover protrusions extending from the first edge or (ii) two of a plurality of cover protrusions of another rear hinge member.

In one embodiment, each of the cover protrusions has a hole for receiving the other of the elastic axis members.

In one embodiment, each of the subset of the rear hinge member further includes a plurality of central supporting bars between the first and second supporting bars, the outer connection protrusions and the inner connection protrusions attached to the central supporting bars.

In one embodiment, the rear hinge member includes a center rear hinge member in a middle of the hinge. Both lateral sides of the center rear hinge member are formed with protrusion insertion space to receive support sidewalls extending from two of the subset of rear hinge members adjacent to the center rear hinge member.

In one embodiment, each of the plurality of rear hinge members, the first edge and the second edge have a same length.

In one embodiment, the foldable display apparatus further includes a panel supporting frame between (i) the flexible display panel and (ii) surfaces of the first rear cover, the second rear cover and the hinge. The panel supporting frame guides folding or unfolding of the bending display area.

In one embodiment, the panel support frame includes a first supporting member, a second supporting member and a bending member between the first supporting member and the second supporting member.

In one embodiment, the bending member includes a patterned surface facing the hinge and a smooth surface facing the bending display area. The patterned surface includes grooves extending parallel to the first and second edges.

In one embodiment, the bending member includes a first outer protrusion overlapping with a portion of the first supporting member and a second outer protrusion overlapping with a portion of the second supporting member. Bosses from the portions of the first and second supporting members extend through the bending member.

In one embodiment, the foldable display apparatus further includes screws inserted into the bosses to secure the bending member to the first and second supporting members. The bosses are aligned along a line parallel to the first and second edges to guide bending of the panel supporting member.

In one embodiment, the first supporting member includes a first line of bosses for coupling to the first rear cover. The second supporting member includes a second line of bosses for coupling to the second rear cover.

In one embodiment, each of the plurality of rear hinge members has a first surface providing support for the bending display area and a second surface at an opposite side of the first surface. An increase in a first distance between two first surfaces of adjacent rear hinge members is different than an increase of a second distance between two second surfaces of the adjacent rear hinge members when the rear hinge members are rotated from the unfolded state into a folded state.

Embodiments also relate to folding or unfolding of a foldable display apparatus. A hinge between a first rear cover provides support for a first flat display area of a flexible display panel and a second rear cover provides support for a second flat display area of the flexible display panel. The hinge is bent to fold the foldable display apparatus. The hinge provides support for a bending area of the flexible display panel between the first and second flat display area.

When the hinge is bent, deformation of a plurality of elastic axis members coupling a plurality of rear hinge members of the hinge in an interlocking manner in an unfolded state is increased, and the rear hinge members are rotated around each other from the unfolded state. The hinge is unbent to unfold the foldable display from a folded state. When the hinge is unbent, deformation of the plurality of elastic axis members is decreased, and the rear hinge members are rotated around each other from the folded state.

In one embodiment, bending of the hinge causes inserting of an inner portion protrusion of one of the rear hinge members into protrusion insertion space of another of the rear hinge members. The inner portion protrusion laterally extending from the one of the rear hinge members.

In one embodiment, unbending of the hinge causes retracting of the inner portion protrusion of one of the rear hinge members from protrusion insertion space of another of the rear hinge members.

In one embodiment, bending of the hinge includes bending a bending member of a panel supporting frame between the flexible display panel and surfaces of the first rear cover, the second rear cover and the hinge.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this application, illustrate embodiment(s) of the invention and together with the description serve to explain the principle of embodiments of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, a foldable display apparatus according to the embodiment of the present invention will be described in detail with reference to the accompanying drawings. Wherever possible, the same reference numbers will be used throughout the drawings to refer to the same or like parts. Also, in the following description of the present invention, if detailed description of elements or functions known in respect of the present invention is determined to make the subject matter of the present invention unnecessarily obscure, the detailed description will be omitted.

Figure 1:
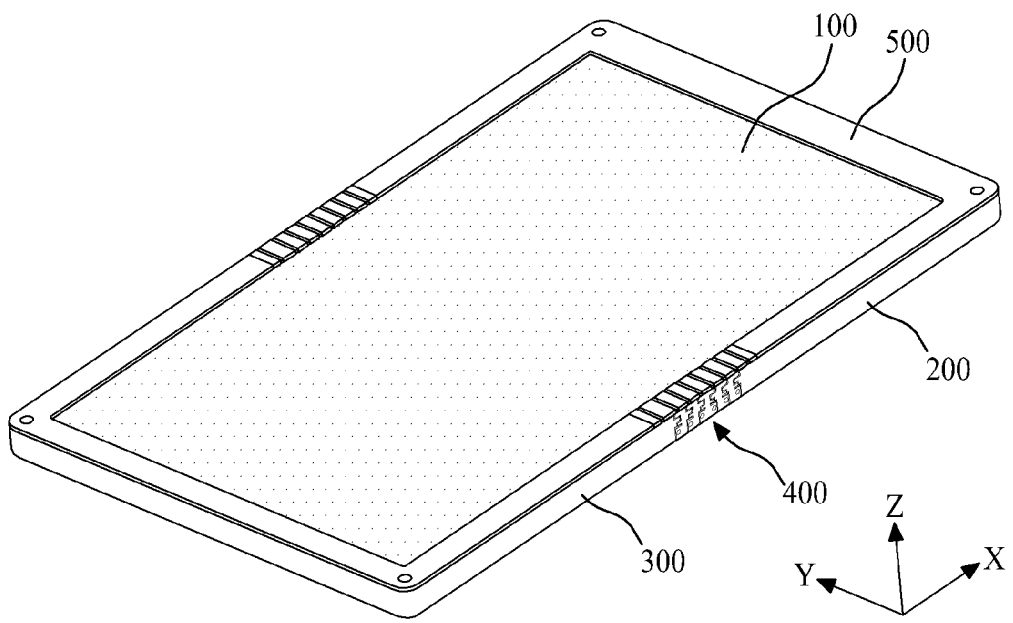
FIG. 1 is a perspective view of a foldable display apparatus according to one embodiment.
Figure 2:
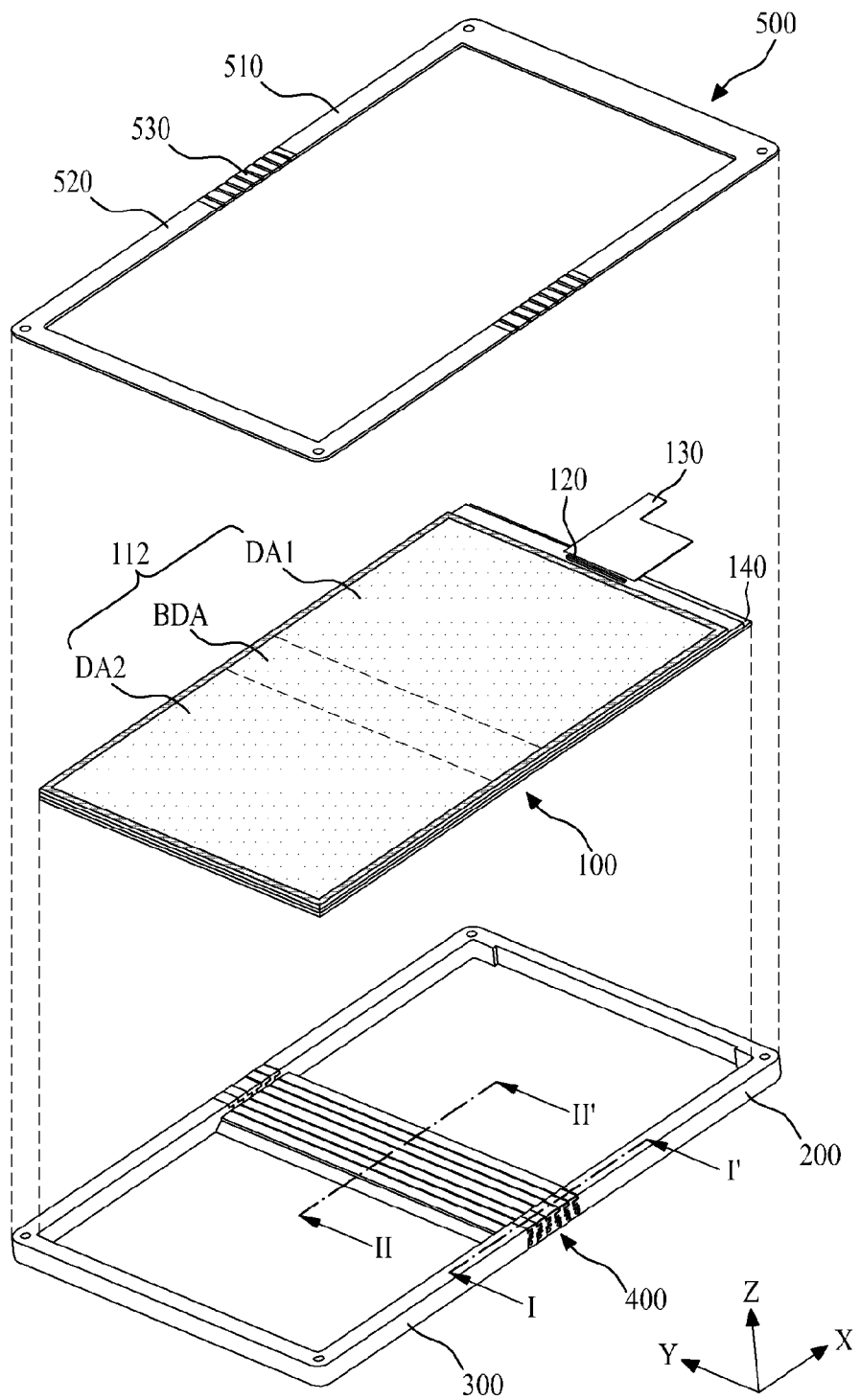
FIG. 2 is an exploded perspective view illustrating a foldable display apparatus of FIG. 1 according to one embodiment.

FIG. 1 schematically illustrates a foldable display apparatus according to the embodiment of the present invention. FIG. 2 is an exploded perspective view illustrating a foldable display apparatus according to one embodiment of the present invention.

Referring to FIGS. 1 and 2, the foldable display apparatus according to one embodiment of the present invention may include a flexible display panel 100, a first rear cover 200, a second rear cover 300, a hinge 400 and a front cover 500.

The flexible display panel 100 may be a flexible organic light emitting display panel, a flexible electrophoretic display panel or a flexible electro-wetting display panel.

The flexible display panel 100 may include a display area 112 for displaying an image by a pixel array provided with a plurality of pixels. The display area 112 may include a first display area DA1, a second display area DA2 and a bending display area BDA.

The first display area DA1 may be defined with a first area of the flexible display panel 100 positioned at one side of the bending display area BDA in the display area 112, and the second display area DA2 may be defined with a second area of the flexible display panel 100 positioned at the other side of the bending display area BDA in the display area 112.

When the flexible display panel 100 is unfolded into the flat state, the first display area DA1, the second display area DA2 and the bending display area BDA constitute one display area 112 to provide a relatively large screen.

If the flexible display panel 100 is bent in accordance with a predetermined curvature with respect to the bending display area BDA, an image is not displayed on the display area 112.

Additionally, the foldable display apparatus according to one embodiment of the present invention may further include a driving integrated circuit 120 and a flexible circuit film 130.

The driving integrated circuit 120 is attached to a chip mounting area prepared in the flexible display panel 100 by a chip bonding process. The driving integrated circuit 120 drives the pixels formed in the display area 112 on the basis of data signal and pixel driving signal supplied through a display pad portion to display an image. Additionally, the driving integrated circuit 120 is mounted on the flexible circuit film 130, and is connected with the pixel array.

The flexible circuit film 130 is attached to the display pad portion prepared in the flexible display panel 100 by a film attachment process. The flexible circuit film 130 transmits various power and signals supplied from a system driver (not shown) to the driving integrated circuit 120. The flexible circuit film 130 may be formed of TCP (Tape Carrier Package), COF (Chip On Flexible Board or Chip On Film), or FPC (Flexible Printed Circuit). Herein, one end of the flexible circuit film 130 is attached to the display pad portion, and the other end of the flexible circuit film 130 is connected with the system driver provided in a receiving space of the second rear cover 200.

A rear surface of the flexible display panel 100 may be supported by a flexible supporting plate 140.

The flexible display panel 100 is maintained in the flat state by the use of flexible supporting plate 140 which is attached to the entire rear surface of the flexible display panel 100. The flexible supporting plate 140 may be formed of a plastic material, for example, any one of PI(Polyimide), PET(Polyethyleneterephthalate), PEN(Polyethylenapthanate), PC(Polycarbonate), PNB(Polynorborneen) and PES (Polyethersulfone). Herein, it is possible to omit the flexible supporting plate 140.

Additionally, the foldable display apparatus according to one embodiment may further include a touch screen (not shown) for a user interface by a user's touch. The touch screen may be attached to the flexible display panel 100, or may be provided inside the flexible display panel 100 for a process of forming the pixel array.

The foldable display apparatus according to one embodiment of the present invention may further include a signal applying portion (not shown) extending from an edge of the flexible display panel 100 so as to have a predetermined width and length instead of the flexible circuit film 130, wherein the signal applying portion (not shown) may be connected with the driving system. In this case, the flexible circuit film 130 is omitted.

The first rear cover 200 receives and supports one side of the flexible display panel 100 corresponding to the first display area DA1 of the flexible display panel 100. The first rear cover 200 is rotatably connected with one side of the hinge 400.

The second rear cover 300 receives and supports the other side of the flexible display panel 100 corresponding to the second display area DA2 of the flexible display panel 100. The second rear cover 300 is rotatably connected with the other side of the hinge 400.

The hinge 400 is connected between the first rear cover 200 and the second rear cover 300. The hinge 400 serves as a rotation axis for folding or unfolding of the bending display area BDA of the flexible display panel 100. Especially, the hinge 400 guides the folding and unfolding of the flexible display panel 100 with respect to the bending display area BDA, and supports the bending display area BDA of the flexible display panel 100 which is unfolded in the flat state or folded in accordance with a predetermined curvature.

The hinge 400 supports the bending display area BDA of the flexible display panel 100 through a plurality of rear hinge covers engaged by an elastic axis member and connected with an inner side of the first rear cover 200 and an inner side of the second rear cover 300. The hinge 400 enables the flexible display panel 100 to fold or unfold without bending by a change of interval between each of the plurality of rear hinge covers.

When the flexile display panel 100 is folded with respect to the bending display area BDA, each of the plurality of rear hinge covers is rotated so as to have a maximum large interval within a range enabling to engage the plurality of rear hinge covers in accordance with a bending-shape change of the elastic axis member so that the bending display area BDA of the flexible display panel 100 is folded with the predetermined curvature without bending the first and second display areas DA1 and DA2 of the flexible display panel 100.

When the flexible display panel 100 is unfolded, the plurality of rear hinge covers are rotated to be engaged in accordance with the elastic restoring force of the elastic axis member whose bending shape is changed, and are concentrated so that the bending display area BDA of the flexible display panel 100 is supported, and the entire area of the flexible display panel 100 is unfolded in the flat state. In this case, the flexible display panel 100 may be unfolded into the flat state by the elastic restoring force of the elastic axis members.

Except the rear hinge cover positioned in the center, the plurality of rear hinge covers may be symmetric with respect to the rear hinge cover positioned in the center.

The front cover 500, which is connected with the first and second rear covers 200 and 300, covers a front edge of the flexible display panel 100. The front cover 500 according to one example may include a front upper cover 510, a front lower cover 520 and a pair of front central covers 530.

The front upper cover 510 is connected with the first rear cover 200 to cover the front edge adjacent to the first display area DA1 of the flexible display panel 100. That is, the front upper cover 510 covers only upper side and left and right sides of the first display area DA1 except the first display area DA1 and the bending display area BDA adjacent to the first display area DA1. The front upper cover 510 may be formed of a hard material.

The front lower cover 520 may be connected with the second rear cover 300 to cover the front edge adjacent to the second display area DA2 of the flexible display panel 100. That is, the front lower cover 520 covers only lower side and left and right sides of the second display area DA2 except the second display area DA2 and the bending display area BDA adjacent to the second display area DA2. The front lower cover 620 may be formed of a hard material.

The pair of front central covers 530 may be connected between the front upper cover 510 and the front lower cover 520 to cover the front edge adjacent to the bending display area BDA of the flexible display panel 100. That is, the pair of front central covers 530 cover only the left and right sides of the bending display area BDA. The pair of front central covers 530 may be formed of a soft material or a soft material with wrinkles. In this case, each of the front upper cover 510 and the front lower cover 520 and the connection portion between the front central covers 530 of one pair may overlap with each other so as to improve formability and adhesiveness.

In the foldable display apparatus according to one example, the interval between each of the plurality of rear hinge covers engaged with each other is changed according to the folding or unfolded state of the flexible display panel 100, whereby the flexible display panel 100 is folded or unfolded without bending. Also, in case of the foldable display apparatus according to one example of the present invention, the flexible display panel 100 is unfolded in the flat state in accordance with the elastic restoring force of the plurality of elastic axis members so that it is possible to improve user's ease for the unfolding of the flexible display panel 100.

Figure 3:
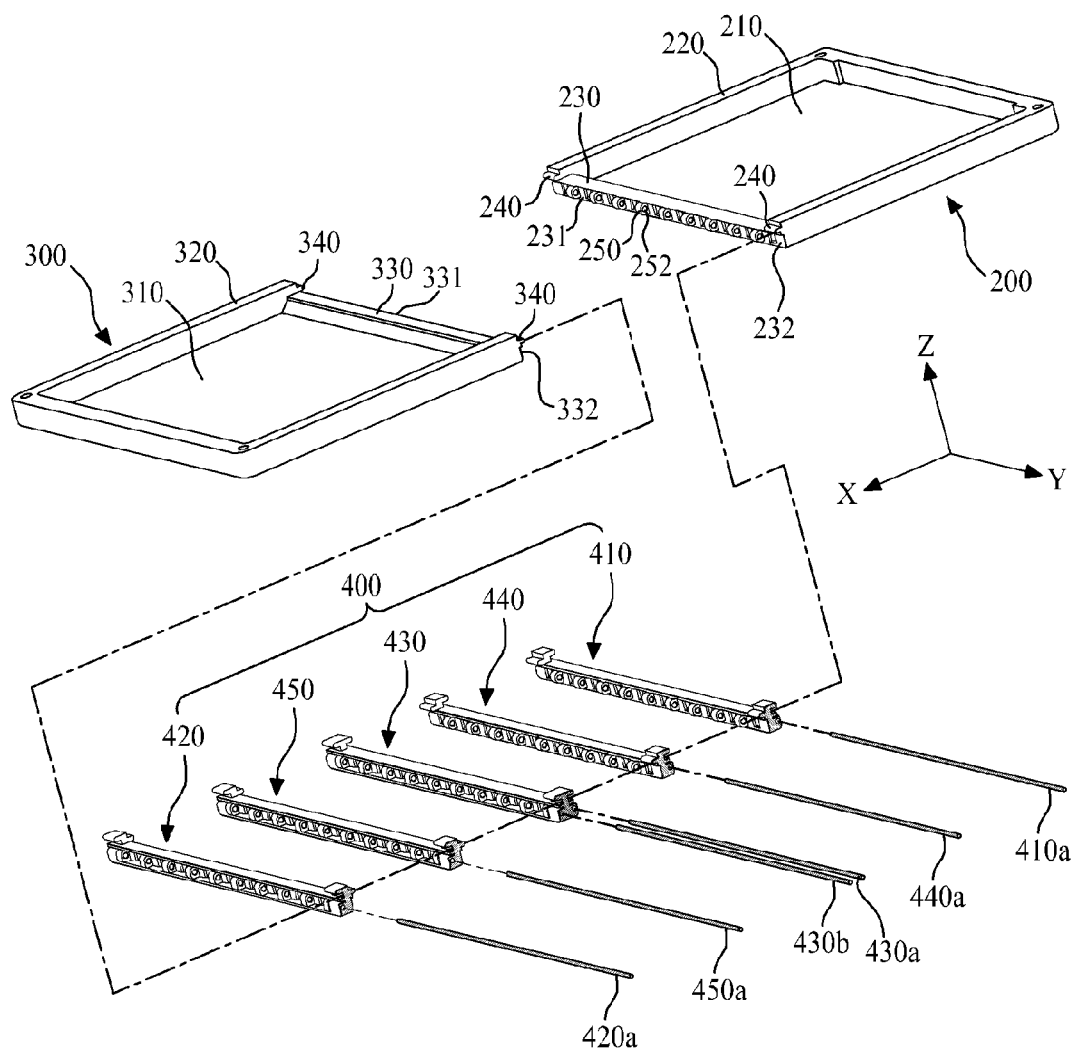
FIG. 3 is an exploded perspective view illustrating structures of first and second rear covers and a hinge of FIG. 2, according to one embodiment.
Figure 4:
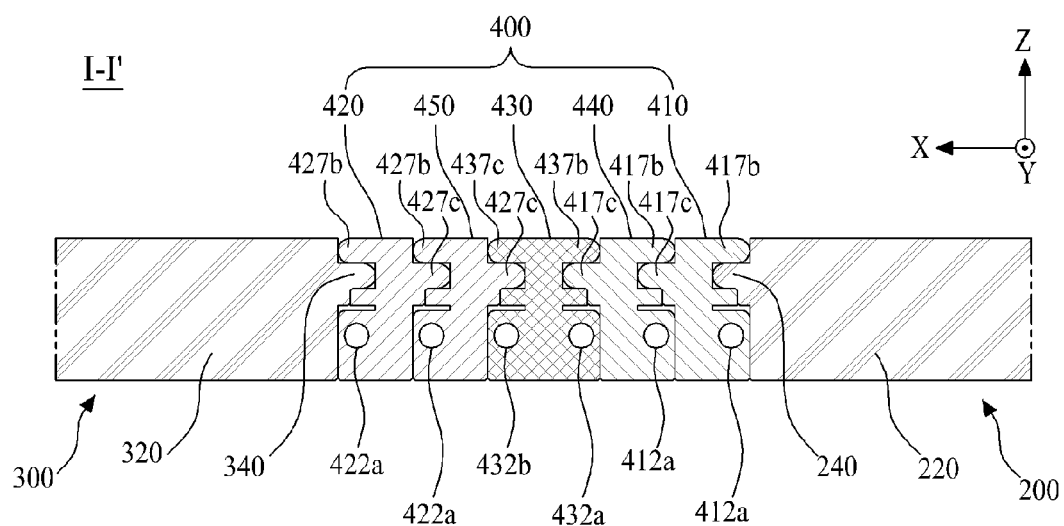
FIG. 4 is a cross sectional view taken along line I-I' of FIG. 2, according to one embodiment.
Figure 5:
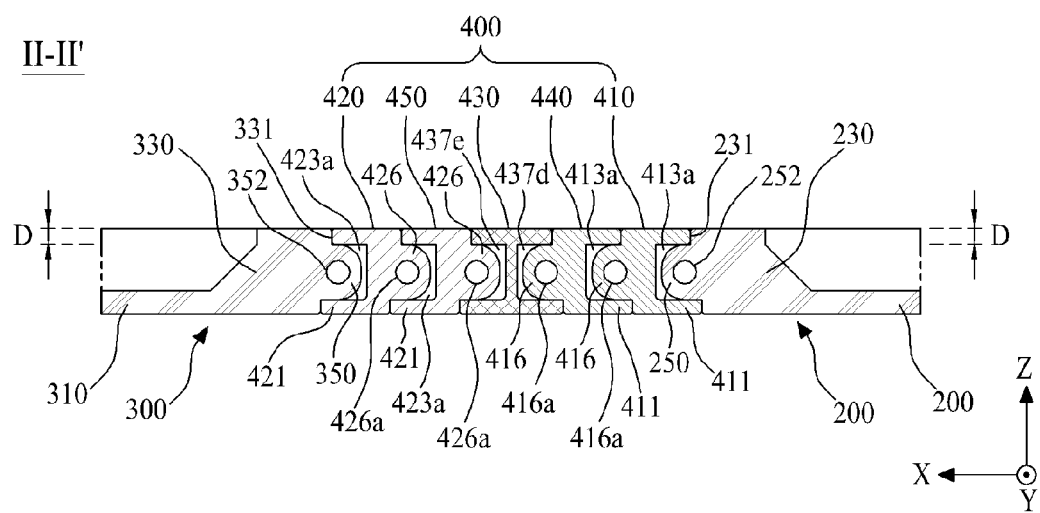
FIG. 5 is a cross sectional view taken along line II-IP of FIG. 2, according to one embodiment.

FIG. 3 is an exploded perspective view illustrating the first and second rear covers and the hinge shown in FIG. 2. FIG. 4 is a cross sectional view along I-I' of FIG. 2. FIG. 5 is a cross sectional view along II-II' of FIG. 2.

Referring to FIGS. 2 to 5, the first rear cover 200 according to one example receives and supports one side of the flexible display panel 100. The first rear cover 200 according to one example may include a first edge 231, a first bottom portion 210, a first sidewall 220, a first panel supporting portion 230, a pair of first portion protrusions 240 and a plurality of first cover protrusions 250.

The first bottom portion 210 covers a rear surface of one side of the flexible display panel 100.

The first sidewall 220 is vertically provided at lateral sides of the first bottom portion 210 connected with one side of the hinge 400 except an inner lateral side of the first bottom portion 210 to surround first area lateral sides of the flexible display panel 100 supported on the first bottom portion 210. The first sidewall 220 protects each lateral side of the flexible display panel 100 from an external shock.

The first panel supporting portion 230 is vertically provided in the inner lateral side of the first bottom portion 210 connected with one side of the hinge 400 to support the flexible display panel 100. A height from the first bottom portion 210 to the first panel supporting portion 230 is lower than a height of the first sidewall 220. In one embodiment, the height of an upper surface of the first panel supporting portion 230 is lower than the height of the upper surface of the first side wall 220. The difference in the height of the upper surface of the first panel supporting portion 230 and the upper surface of the first side wall is equal to the thickness of the flexible display panel 100. Additionally, the upper surface of the first panel supporting portion 230 may be connected with a predetermined portion of a rear surface of the first display area DA1 of the flexible display panel 100 adjacent to the bending display area BDA of the flexible display panel 100 by the use of adhesive member (not shown) such as adhesive or double-sided tape.

The pair of first portion protrusions 240 may protrude from the first sidewall 220 confronting one side of the hinge 400 toward the hinge 400. That is, each of the first portion protrusions 240 of one pair is provided at a predetermined distance (D) from an upper surface of the first sidewall 220, and each of the first portion protrusions 240 of one pair protrudes from an inner lateral side of the first sidewall 220 facing a first direction (X) toward the hinge 400 to have a predetermined length in the first direction (X). Accordingly, a stepped portion is prepared between the first sidewall 220 and each of the first portion protrusions 240 of one pair. Additionally, a protruding end in each of the first portion protrusions 240 of one pair directly confronting the hinge 400 may have a cross section with a curved-line surface for smooth connection and rotation with the hinge 400, for example, a semicircle-shaped cross section.

The plurality of first cover protrusions 250 are provided at fixed intervals in a lateral side of the first panel supporting portion 230, and more particularly, an inner sidewall 232 of the first panel supporting portion 230 directly confronting one side of the hinge 400. That is, the plurality of first cover protrusions 250 protrude from the inner sidewall 232 of the first panel supporting portion 230 toward the hinge 400 so as to have a predetermined length in the first direction (X). Each of the plurality of first cover protrusions 250 has a first axis supporting hole 252 prepared in the center thereof.

The second rear cover 300 according to one example receives and supports the other side of the flexible display panel 100. The second rear cover 300 may include a second bottom portion 310, a second sidewall 320, a second panel supporting portion 330, a second edge 331, a pair of second portion protrusions 340 and a plurality of second cover protrusions 350. The second rear cover 300 is symmetric in structure to the first rear cover 200 with respect to the hinge 400.

The second bottom portion 310 covers a rear surface of the other side of the flexible display panel 100.

The second sidewall 320 is vertically provided at lateral sides of the second bottom portion 310 connected with the other side of the hinge 400 except an inner lateral side of the second bottom portion 310 to surround second area lateral sides of the flexible display panel 100 supported on the second bottom portion 310. The second sidewall 320 protects each lateral side of the flexible display panel 100 from an external shock.

The second panel supporting portion 330 is vertically provided in the inner lateral side of the second bottom portion 310 connected with the other side of the hinge 400 to support the flexible display panel 100. A height from the second bottom portion 310 to the second panel supporting portion 330 is lower than a height of the second sidewall 320. In one embodiment, the height of an upper surface of the second panel supporting portion 330 is lower than the height of the upper surface of the second side wall 320. The difference in the height of the upper surface of the second panel supporting portion 330 and the upper surface of the second side wall 320 is equal to the thickness of the flexible display panel 100. Additionally, the upper surface of the second panel supporting portion 330 may be connected with a predetermined portion of a rear surface of the second display area DA2 of the flexible display panel 100 adjacent to the bending display area BDA of the flexible display panel 100 by the use of adhesive member (not shown) such as adhesive or double-sided tape.

The pair of second portion protrusions 340 may protrude from the second sidewall 320 confronting the other side of the hinge 400 toward the hinge 400. That is, each of the second portion protrusions 340 of one pair is provided at a predetermined distance (D) from an upper surface of the second sidewall 320, and each of the second portion protrusions 340 of one pair protrudes from an inner lateral side of the second sidewall 320 facing the first direction (X) toward the hinge 400 to have a predetermined length in the first direction (X). Accordingly, a stepped portion is prepared between the second sidewall 320 and each of the second portion protrusions 340 of one pair. Additionally, a protruding end in each of the second portion protrusions 340 of one pair directly confronting the hinge 400 may have a cross section with a curved-line surface for smooth connection and rotation with the hinge 400, for example, a semicircle-shaped cross section.

The plurality of second cover protrusions 350 are provided at fixed intervals in a lateral side of the second panel supporting portion 330, and more particularly, an inner sidewall 332 of the second panel supporting portion 330 directly confronting the other side of the hinge 400. That is, the plurality of second cover protrusions 350 protrude from the inner sidewall 332 of the second panel supporting portion 330 toward the hinge 400 so as to have a predetermined length in the first direction (X). Each of the plurality of second cover protrusions 350 has a second axis supporting hole 352 prepared in the center thereof.

The hinge 400 according to one example may include a first rear hinge cover 410, a second rear hinge cover 420 and a third rear hinge cover 430.

Figure 6:
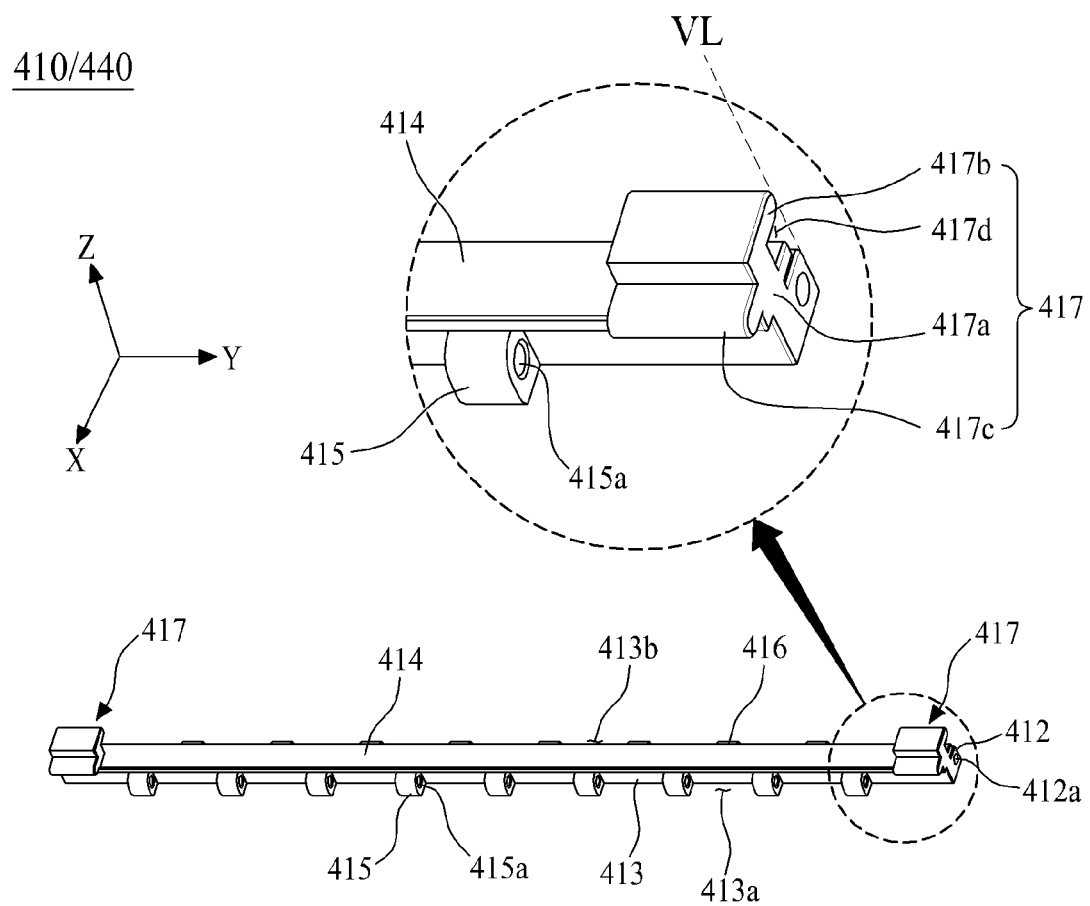
FIG. 6 illustrates a first rear hinge of FIG. 3, according to one embodiment.

The first rear hinge cover 410 is rotatably connected with the first rear cover 200 by a first elastic axis member 410a. As shown in FIGS. 4 to 6, the first rear hinge cover 410 according to one example may include a first lower supporting bar 411, a pair of first edge sidewalls 412, a first central supporting bar 413, a first upper supporting bar 414, a plurality of first outer connection protrusions 415, a plurality of first inner connection protrusions 416 and a pair of first rotation axes 417.

The first lower supporting bar 411 is prepared in a rectangular shape whose length is the same as the length of the first edge 231 of the first rear cover 200.

The pair of first edge sidewalls 412 is provided to have a predetermined height in both sides of the first lower supporting bar 411. The pair of first edge sidewalls 412 may have a third axis supporting hole 412a into which the first elastic axis member 410a is inserted.

The first central supporting bar 413 is vertically prepared in an upper surface of the first lower supporting bar 411. The first central supporting bar 413 may be vertically prepared in an outer side of the first lower supporting bar 411 adjacent to the second rear cover 300.

The first upper supporting bar 414 is prepared in an upper surface of each of the first central supporting bar 413 and the pair of first edge sidewalls 412 while being overlapped with the first lower supporting bar 411. Accordingly, the first central supporting bar 413, the first upper supporting bar 414 and the remaining central portions of the first lower supporting bar 411 except both sides of the first lower supporting bar 411 may have a cross section of '[' shape.

The plurality of first outer connection protrusions 415 are provided at fixed intervals along a length direction (Y) of the first central supporting bar 413, wherein each of the plurality of first outer connection protrusions 415 protrudes toward the first rear cover 200 so as to have a predetermined length in the first direction (X) from an outer surface of the first central supporting bar 413. In this case, the plurality of first outer connection protrusions 415 alternates with the plurality of first cover protrusions 250 prepared in the first rear cover 200, whereby the first rear hinge cover 410 has a plurality of first outer insertion spaces 413a, wherein each of the plurality of first outer insertion spaces 413a is prepared between each of the plurality of first outer connection protrusions 415.

Each of the plurality of first outer connection protrusions 415 is inserted into the space between each of the plurality of first cover protrusions 250 in the first rear cover 200. That is, each of the plurality of first outer connection protrusions 415 is inserted into the space between each of the plurality of first cover protrusions 250, and each of the plurality of first cover protrusions 250 is inserted into the space between each of the plurality of first outer insertion spaces 413a. Accordingly, the plurality of first outer connection protrusions 415 are engaged with the plurality of first cover protrusions 250, wherein the plurality of first outer connection protrusions 415 alternate with the plurality of first cover protrusions 250.

Each of the plurality of first outer connection protrusions 415 has a fourth axis supporting hole 415a overlapped with the third axis supporting hole 412a.

The plurality of first inner connection protrusions 416 are provided at fixed intervals along the length direction (Y) of the first central supporting bar 413, wherein each of the plurality of first inner connection protrusions 416 protrudes toward the second rear cover 300 so as to have a predetermined length in the first direction (X) from an inner surface of the first central supporting bar 413. Each of the plurality of first inner connection protrusions 416 has a fifth axis supporting hole 416a. With respect to the length direction (Y) of the first central supporting bar 413, a first inner insertion space 413b is prepared between each of the plurality of first inner connection protrusions 416.

Each of the plurality of first inner connection protrusions 416 is prepared between each of the plurality of first outer connection protrusions 415. That is, the plurality of first outer connection protrusions 415 and the plurality of first inner connection protrusions 416, which alternate with each other, are provided in a zigzag pattern with the first central supporting bar 413 provided in-between.

The pair of first rotation axes 417 is prepared at both sides of the first upper supporting bar 414, wherein the pair of first rotation axes 417 serve as a rotation axis for the first rear hinge cover 410. Each of the first rotation axes 417 included in one pair according to one example may include a first supporting sidewall 417a, a first outer portion protrusion 417b and a first inner portion protrusion 417c.

The first supporting sidewall 417a is vertically prepared in an upper surface of the first upper supporting bar 414. The first supporting sidewall 417a supports the first outer portion protrusion 417b and the first inner portion protrusion 417c.

The first outer portion protrusion 417b, which overlaps with the upper surface of the first upper supporting bar 414, protrudes to have a predetermined length from an upper outer surface of the first supporting sidewall 417a. In this case, the first outer portion protrusion 417b has a protruding length which is not protruding out of a vertical line VL vertically extending from an outer short side of the first lower supporting bar 411, and also overlaps with an upper surface of the first upper supporting bar 414. Additionally, a protruding end of the first outer portion protrusion 417b may have a cross section with a curved-line surface for smooth connection and rotation with the adjacent first rear cover 200, for example, a semicircle-shaped cross section.

The first outer portion protrusion 417b is overlapped with the upper surface of the first upper supporting bar 414 by the first supporting sidewall 417a, and is also provided at a predetermined distance from the upper surface of the first upper supporting bar 414 so that a first protrusion insertion space 417d is prepared between the first outer portion protrusion 417b and the first upper supporting bar 414 being overlapped with each other. That is, the first outer portion protrusion 417b and the first upper supporting bar 414 are provided in parallel with the first protrusion insertion space 417d provided in-between. When the first portion protrusion 240 prepared in the first rear cover 200 is inserted into the first protrusion insertion space 417d, the first rear hinge cover 410 is engaged and connected with the first rear cover 200.

The first inner portion protrusion 417c protrudes from an inner surface of the first supporting sidewall 417a, wherein the first inner portion protrusion 417c has a predetermined length whose direction is in opposition to the protruding direction of the first outer portion protrusion 417b while being parallel to the upper surface of the first upper supporting bar 414. A protruding length of the first inner portion protrusion 417c from the first supporting sidewall 417a may be the same as a protruding length of the first outer portion protrusion 417b from the first supporting sidewall 417a. The first inner portion protrusion 417c is engaged and connected with the third rear hinge cover 430. Additionally, a protruding end of the first inner portion protrusion 417c may have a cross section with a curved-line surface for smooth connection and rotation with the third rear hinge cover 430, for example, a semicircle-shaped cross section.

Figure 7:
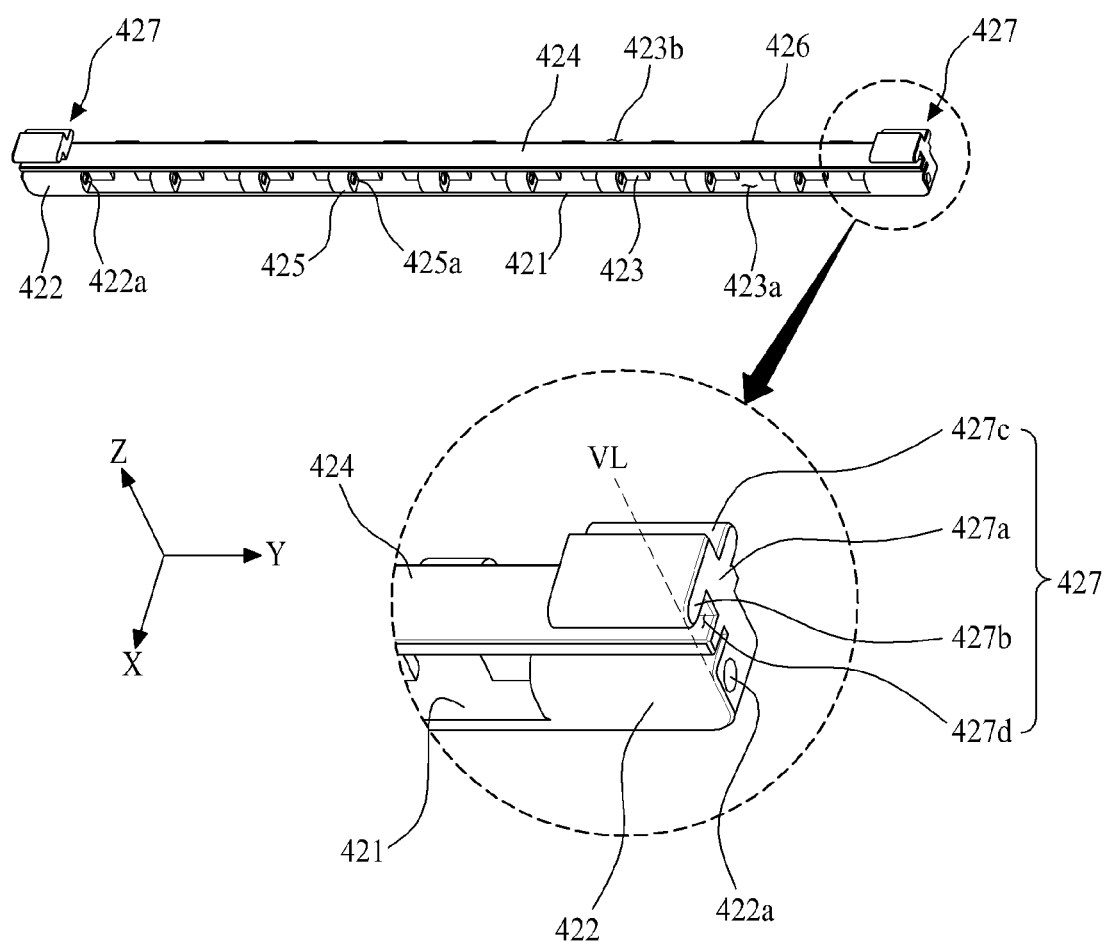
FIG. 7 illustrates a second rear hinge cover of FIG. 3, according to one embodiment.

Referring once again to FIGS. 2 to 5, the second rear hinge cover 420 is rotatably connected with the second rear cover 300 by the second elastic axis member 420a. As shown in FIGS. 4, 5 and 7, the second rear hinge cover 420 according to one example may include a second lower supporting bar 421, a pair of second edge sidewalls 422, a second central supporting bar 423, a second upper supporting bar 424, a plurality of second outer connection protrusions 425, a plurality of second inner connection protrusions 426 and a pair of second rotation axes 427. The second rear hinge cover 420 is symmetric to the first rear hinge cover 410 with respect to the third rear hinge cover 430, whereby a detailed description for the same parts will be omitted, and a brief description for the second rear hinge cover 420 will be shown as follows.

The second lower supporting bar 421 is prepared in a rectangular shape whose length is the same as a second side 331 of the second rear cover 300. The pair of second edge sidewalls 422 may be provided in both sides of the second lower supporting bar 421, and the pair of second edge sidewalls 422 may have a sixth axis supporting hole 422a into which the second elastic axis member 420a is inserted. The second central supporting bar 423 is vertically prepared in an upper surface of the second lower supporting bar 421. The second upper supporting bar 424 is prepared in an upper surface of each of the second central supporting bar 423 and the pair of second edge sidewalls 422 while being overlapped with the second lower supporting bar 421. Accordingly, the second central supporting bar 423, the second upper supporting bar 424 and the remaining central portions of the second lower supporting bar 421 except both sides of the second lower supporting bar 421 may have a cross section of ']' shape.

The plurality of second outer connection protrusions 425 protrude from the outer surface of the second central supporting bar 423 toward the second rear cover 300. In this case, the plurality of second outer connection protrusions 425 alternate with the plurality of second cover protrusions 350 prepared in the second rear cover 300, whereby the second rear hinge cover 420 has a plurality of second outer insertion spaces 423a, wherein each of the plurality of second outer insertion spaces 423a is prepared between each of the plurality of second outer connection protrusions 425.

Each of the plurality of second outer connection protrusions 425 is inserted into the space between each of the plurality of second cover protrusions 350 in the second rear cover 300. That is, each of the plurality of second outer connection protrusions 425 is inserted into the space between each of the plurality of second cover protrusions 350, and each of the plurality of second cover protrusions 350 is inserted into each of the plurality of second outer insertion spaces 423a. Accordingly, the plurality of second outer connection protrusions 425 are engaged with the plurality of second cover protrusions 350, wherein the plurality of second outer connection protrusions 425 alternate with the plurality of second cover protrusions 350.

Each of the plurality of second outer connection protrusions 425 has a seventh axis supporting hole 425a overlapped with the sixth axis supporting hole 422a.

The plurality of second inner connection protrusions 426 protrude from the inner surface of the second central supporting bar 423 toward the first rear cover 200. Each of the plurality of second inner connection protrusions 426 has an eighth axis supporting hole 426a. With respect to the length direction (Y) of the second central supporting bar 423, a second inner insertion space 423b is prepared between each of the plurality of second inner connection protrusions 426. Accordingly, the plurality of second outer connection protrusions 425 and the plurality of second inner connection protrusions 426, which alternate with each other, are provided in a zigzag pattern with the second central supporting bar 423 provided in-between.

The pair of second rotation axes 427 is prepared at both sides of the second upper supporting bar 424, wherein the pair of second rotation axes 427 serve as a rotation axis for the second rear hinge cover 420. Each of the second rotation axes 427 included in one pair according to one example may include a second supporting sidewall 427a, a second outer portion protrusion 427b and a second inner portion protrusion 427c.

The second supporting sidewall 427a is vertically prepared in an upper surface of the second upper supporting bar 424.

The second outer portion protrusion 427b, which is overlapped with the upper surface of the second upper supporting bar 424, protrudes to have a predetermined length from an upper outer surface of the second supporting sidewall 427a. A protruding end of the second outer portion protrusion 427b may have a cross section with a curved-line surface for smooth connection and rotation with the adjacent second rear cover 300, for example, a semicircle-shaped cross section. In this case, the second outer portion protrusion 427b has a protruding length which is not protruding out of a vertical line VL vertically extending from an outer short side of the second lower supporting bar 421, and is also overlapped with an upper surface of the second upper supporting bar 424.

The second outer portion protrusion 427b is overlapped with the upper surface of the second upper supporting bar 424 by the second supporting sidewall 427a, and is also provided at a predetermined distance from the upper surface of the second upper supporting bar 424 so that a second protrusion insertion space 427d is prepared between the second outer portion protrusion 427b and the second upper supporting bar 424 being overlapped with each other. That is, the second outer portion protrusion 427b and the second upper supporting bar 424 are provided in parallel with the second protrusion insertion space 427d provided in-between. According as the second portion protrusion 340 prepared in the second rear cover 300 is inserted into the second protrusion insertion space 427d, the second rear hinge cover 420 is engaged and connected with the second rear cover 300.

The second inner portion protrusion 427c protrudes from an inner surface of the second supporting sidewall 427a, wherein the second inner portion protrusion 427c has a predetermined length whose direction is in opposition to the protruding direction of the second outer portion protrusion 427b while being parallel to the upper surface of the second upper supporting bar 424. Additionally, a protruding end of the second inner portion protrusion 427c may have a cross section with a curved-line surface for smooth connection and rotation with the third rear hinge cover 430, for example, a semicircle-shaped cross section.

Figure 8:
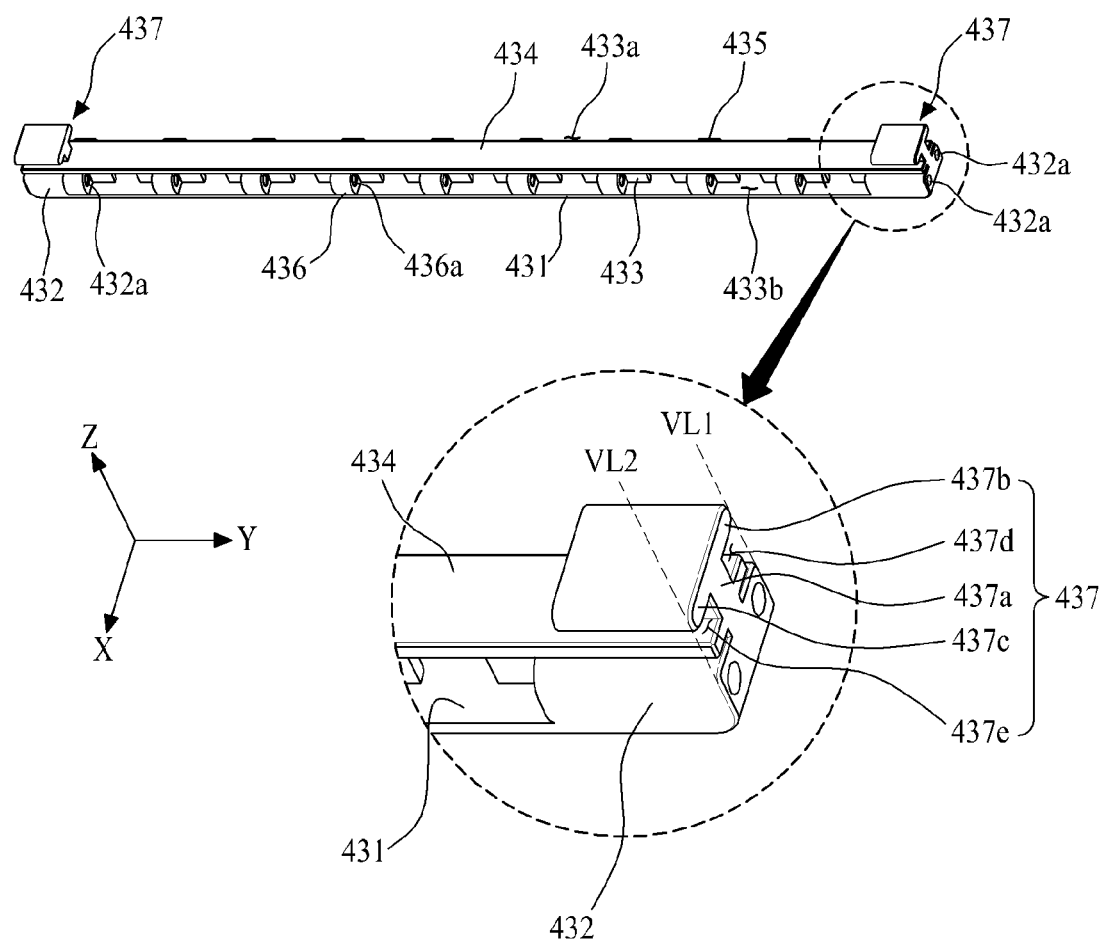
FIG. 8 illustrates a third rear hinge cover of FIG. 3, according to one embodiment.

Referring once again to FIGS. 2 to 5, the third rear hinge cover 420 is provided between the first and second rear hinge covers 410 and 420, whereby the first and second rear hinge covers 410 and 420 are rotatably supported by the third and fourth elastic axis members 430a and 430b. The third rear hinge cover 430 is a rear surface central hinge cover, wherein the third rear hinge cover 430 serves as a folding reference axis when the flexible display panel 100 is folded. The first rear hinge cover 410 and the second rear hinge cover 420 are folded with respect to the third rear hinge cover 430. As shown in FIGS. 4, 5 and 8, the third rear hinge cover 430 according to one example may include a third lower supporting bar 431, a pair of third edge sidewalls 432, a third central supporting bar 433, a third upper supporting bar 434, a pair of third outer connection protrusion 435, a plurality of third inner connection protrusions 436 and a pair of third rotation axes 437.

The third lower supporting bar 431 is prepared in a rectangular shape whose length is the same as those of the first and second rear hinge bars 411 and 421.

The pair of third edge sidewalls 432 is provided to have a predetermined height in both sides of the third lower supporting bar 431. The pair of third edge sidewalls 432 may have ninth and tenth axis supporting holes 432a and 432b into which the third and fourth elastic axis members 430a and 430b are respectively inserted. In this case, the ninth axis supporting hole 432a passes through the outer side of each of the third edge sidewalls 432 of one pair in a length direction (Y) of the third lower supporting bar 431, and the tenth axis supporting hole 432b passes through the inner side of each of the third edge sidewalls 432 of one pair in the length direction (Y) of the third lower supporting bar 431.

The third central supporting bar 433 is vertically prepared in the center of an upper surface of the third lower supporting bar 431.

The third upper supporting bar 434 is prepared in the upper surface of each of the third central supporting bar 433 and the pair of third edge sidewalls 432 while being overlapped with the third lower supporting bar 431. Accordingly, the third central supporting bar 433, the third upper supporting bar 434 and the remaining central portions of the third lower supporting bar 431 except both sides of the third lower supporting bar 431 may have a cross section of 'I' shape.

The plurality of third outer connection protrusions 435 are provided at fixed intervals along the length direction (Y) of the third central supporting bar 433, wherein each of the plurality of third outer connection protrusions 435 protrudes toward the first rear cover 200 so as to have a predetermined length in the first direction (X) from an outer surface of the third central supporting bar 433. In this case, the plurality of third outer connection protrusions 435 alternate with the plurality of first inner connection protrusions 416 prepared in the first rear hinge cover 410, whereby the third rear hinge cover 430 has a plurality of third outer insertion spaces 433a, wherein each of the plurality of third outer insertion spaces 433a is prepared between each of the plurality of third outer connection protrusions 435.

Each of the plurality of third outer connection protrusions 435 is inserted into each of the plurality of first inner insertion spaces 413b prepared in the first rear hinge cover 410. That is, each of the plurality of third outer connection protrusions 435 is inserted into the space between each of the plurality of first inner connection protrusions 416, and each of the plurality of first inner connection protrusions 416 is inserted into each of the plurality of third outer insertion spaces 433a. Accordingly, the plurality of third outer connection protrusions 435 are engaged with the plurality of first inner connection protrusions 416, wherein the plurality of third outer connection protrusions 435 alternate with the plurality of first inner connection protrusions 416.

Each of the plurality of third outer connection protrusions 435 may have an eleventh axis supporting hole (not shown) overlapped with the ninth axis supporting hole 432a.

The plurality of third inner connection protrusions 436 are provided at fixed intervals along the length direction (Y) of the third central supporting bar 433, wherein each of the plurality of third inner connection protrusions 436 protrudes toward the second rear cover 300 so as to have a predetermined length in the first direction (X) from an inner surface of the third central supporting bar 433. Each of the plurality of third inner connection protrusions 436 has a twelfth axis supporting hole 436a. With respect to the length direction (Y) of the third central supporting bar 433, a third inner insertion space 433b is prepared between each of the plurality of third inner connection protrusions 436.

Each of the plurality of third inner connection protrusions 436 is prepared between each of the plurality of third outer connection protrusions 435. That is, the plurality of third outer connection protrusions 435 and the plurality of third inner connection protrusions 436, which alternate with each other, are provided in a zigzag pattern with the third central supporting bar 433 provided in-between.

The pair of third rotation axes 437 is prepared at both sides of the third upper supporting bar 434, wherein the pair of third rotation axes 437 serve as a rotation axis for each of the first and second rear hinge covers 410 and 420. Each of the third rotation axes 437 included in one pair according to one example may include a third supporting sidewall 437a, a third outer portion protrusion 437b and a third inner portion protrusion 437c.

The third supporting sidewall 437a is vertically prepared in the center of an upper surface of the third upper supporting bar 434 to support the third outer portion protrusion 437b and the third inner portion protrusion 437c.

The third outer portion protrusion 437b, which is overlapped with the upper surface of the third upper supporting bar 434, protrudes to have a predetermined length from an upper outer surface of the third supporting sidewall 437a. In this case, the third outer portion protrusion 437b has a protruding length which is not protruding out of a vertical line VL vertically extending from an outer short side of the third lower supporting bar 431, and is also overlapped with an upper surface of the third upper supporting bar 434. Additionally, a protruding end of the third outer portion protrusion 437b may have a cross section with a curved-line surface for smooth connection and rotation with the first rear hinge cover 410, for example, a semicircle-shaped cross section.

The third outer portion protrusion 437b is overlapped with the upper surface of the third upper supporting bar 434 by the third supporting sidewall 437a, and is also provided at a predetermined distance from the upper surface of the third upper supporting bar 434 so that a third protrusion insertion space 437d is prepared between the third outer portion protrusion 437b and the third upper supporting bar 434 being overlapped with each other. That is, the third outer portion protrusion 437b and the third upper supporting bar 434 are provided in parallel with the third protrusion insertion space 437d provided in-between. According as the first inner portion protrusion 417c prepared in the first rear hinge cover 410 is inserted into the third protrusion insertion space 437d, the third rear hinge cover 430 is engaged and connected with the first rear hinge cover 410.

The third inner portion protrusion 437c, which is overlapped with the upper surface of the third upper supporting bar 434, protrudes to have a predetermined length from an upper inner surface of the third supporting sidewall 437a. In this case, the third inner portion protrusion 437c has a protruding length which is not protruding out of a vertical line VL vertically extending from an inner short side of the third lower supporting bar 431, and is also overlapped with an upper surface of the third upper supporting bar 434. Additionally, a protruding end of the third inner portion protrusion 437c may have a cross section with a curved-line surface for smooth connection and rotation with the second rear hinge cover 420, for example, a semicircle-shaped cross section.

The third inner portion protrusion 437c is overlapped with the upper surface of the third upper supporting bar 434 by the third supporting sidewall 437a, and is also provided at a predetermined distance from the upper surface of the third upper supporting bar 434 so that a fourth protrusion insertion space 437e is prepared between the third inner portion protrusion 437c and the third upper supporting bar 434 being overlapped with each other. That is, the third inner portion protrusion 437c and the third upper supporting bar 434 are provided in parallel with the fourth protrusion insertion space 437e provided in-between. According as the second inner portion protrusion 427c prepared in the second rear hinge cover 410 is inserted into the fourth protrusion insertion space 437e, the third rear hinge cover 430 is engaged and connected with the second rear hinge cover 420.

Additionally, the hinge 400 according to one example may further include a fourth rear hinge cover 440 and a fifth rear hinge cover 450.

The fourth rear hinge cover 440 is rotatably connected between the first rear hinge cover 410 and the third rear hinge cover 430. For example, the fourth rear hinge cover 440 is rotatably connected with the first rear hinge cover 410 by the fifth elastic axis member 440a, and is also rotatably connected with the third rear hinge cover 430 by the third elastic axis member 430a. In the same manner as the first rear hinge cover 410 shown in FIG. 6, the fourth rear hinge cover 440 may include a first lower supporting bar 411, a pair of first edge sidewalls 412, a first central supporting bar 413, a first upper supporting bar 414, a plurality of first outer connection protrusions 415, a plurality of first inner connection protrusions 416 and a pair of first rotation axes 417, whereby the same reference numbers will be used throughout the drawings to refer to the same or like parts, and a detailed description for the same parts will be omitted.

Each of a plurality of first outer connection protrusions 415 prepared in the fourth rear hinge cover 440 is inserted into each first inner insertion space 413b provided between each of the plurality of first inner connection protrusions 416 prepared in the first rear hinge cover 410. Accordingly, the plurality of first outer connection protrusions 415 prepared in the fourth rear hinge cover 440 are engaged with the plurality of first inner connection protrusions 416 prepared in the first rear hinge cover 410, wherein the plurality of first outer connection protrusions 415 prepared in the fourth rear hinge cover 440 alternate with the plurality of first inner connection protrusions 416 prepared in the first rear hinge cover 410.

Each of a plurality of first inner connection protrusions 416 prepared in the fourth rear hinge cover 440 is inserted into each third outer insertion space 433a provided between each of the plurality of third outer connection protrusions 435 prepared in the third rear hinge cover 430. Accordingly, the plurality of first inner connection protrusions 416 prepared in the fourth rear hinge cover 440 are engaged with the plurality of third outer connection protrusions 435 prepared in the third rear hinge cover 430, wherein the plurality of first inner connection protrusions 416 prepared in the fourth rear hinge cover 440 alternate with the plurality of third outer connection protrusions 435 prepared in the third rear hinge cover 430.

A pair of first rotation axes 417 prepared in the fourth rear hinge cover 440 may include a first outer portion protrusion 417b, a first inner portion protrusion 417c and a first protrusion insertion space 417d.

The first outer portion protrusion 417b of the fourth rear hinge cover 440 is overlapped in an up-and-down direction with and also connected with the first inner portion protrusion 417c of the first rear hinge cover 410. That is, the first inner portion protrusion 417c of the first rear hinge cover 410 is inserted into the first protrusion insertion space 417d of the fourth rear hinge cover 440 so that the first outer portion protrusion 417b of the fourth rear hinge cover 440 is overlapped in an up-and-down direction with the first inner portion protrusion 417c of the first rear hinge cover 410, whereby the fourth rear hinge cover 440 is engaged and connected with the first rear hinge cover 410.

When the first inner portion protrusion 417c of the fourth rear hinge cover 440 is inserted into the third protrusion insertion space 437d of the third rear hinge cover 430, the first inner portion protrusion 417c of the fourth rear hinge cover 440 is overlapped in an up-and-down direction with the third outer portion protrusion 437b of the third rear hinge cover 430, whereby the fourth rear hinge cover 440 is engaged and connected with the third rear hinge cover 430.

The fifth rear hinge cover 450 is rotatably connected between the second rear hinge cover 420 and the third rear hinge cover 430. For example, the fifth rear hinge cover 450 is rotatably connected with the second rear hinge cover 420 by the sixth elastic axis member 450a, and is also rotatably connected with the third rear hinge cover 430 by the fourth elastic axis member 430b. In the same manner as the second rear hinge cover 420 shown in FIG. 7, the fifth rear hinge cover 450 may include a second lower supporting bar 421, a pair of second edge sidewalls 422, a second central supporting bar 423, a second upper supporting bar 424, a plurality of second outer connection protrusions 425, a plurality of second inner connection protrusions 426 and a pair of second rotation axes 427, whereby the same reference numbers will be used throughout the drawings to refer to the same or like parts, and a detailed description for the same parts will be omitted.

Each of a plurality of second outer connection protrusions 425 prepared in the fifth rear hinge cover 450 is inserted into each second inner insertion space 423b provided between each of the plurality of second inner connection protrusions 426 prepared in the second rear hinge cover 420. Accordingly, the plurality of second outer connection protrusions 425 prepared in the fifth rear hinge cover 450 are engaged with the plurality of second inner connection protrusions 426 prepared in the second rear hinge cover 420, wherein the plurality of second outer connection protrusions 425 prepared in the fifth rear hinge cover 450 alternate with the plurality of second inner connection protrusions 426 prepared in the second rear hinge cover 420.

Each of a plurality of second inner connection protrusions 426 prepared in the fifth rear hinge cover 450 is inserted into each third inner insertion space 433b provided between each of the plurality of third inner connection protrusions 436 prepared in the third rear hinge cover 430. Accordingly, the plurality of second inner connection protrusions 426 prepared in the fifth rear hinge cover 450 are engaged with the plurality of third inner connection protrusions 436 prepared in the third rear hinge cover 430, wherein the plurality of second inner connection protrusions 426 prepared in the fifth rear hinge cover 450 alternate with the plurality of third inner connection protrusions 436 prepared in the third rear hinge cover 430.

A pair of second rotation axes 427 prepared in the fifth rear hinge cover 450 may include a second outer portion protrusion 427b, a second inner portion protrusion 427c and a second protrusion insertion space 427d.

The first outer portion protrusion 427b of the fifth rear hinge cover 450 is overlapped in an up-and-down direction with and also connected with the second inner portion protrusion 427c of the second rear hinge cover 420. That is, the second inner portion protrusion 427c of the second rear hinge cover 420 is inserted into the second protrusion insertion space 427d of the fifth rear hinge cover 450 so that the second outer portion protrusion 427b of the fifth rear hinge cover 450 is overlapped in an up-and-down direction with the second inner portion protrusion 427c of the second rear hinge cover 420, whereby the fifth rear hinge cover 450 is engaged and connected with the second rear hinge cover 420.

According as the second inner portion protrusion 427c of the fifth rear hinge cover 450 is inserted into the fourth protrusion insertion space 437e of the third rear hinge cover 430, the second inner portion protrusion 427c of the fifth rear hinge cover 450 is overlapped in an up-and-down direction with the third inner portion protrusion 437c of the third rear hinge cover 430, whereby the fifth rear hinge cover 450 is engaged and connected with the third rear hinge cover 430.

Figure 9:
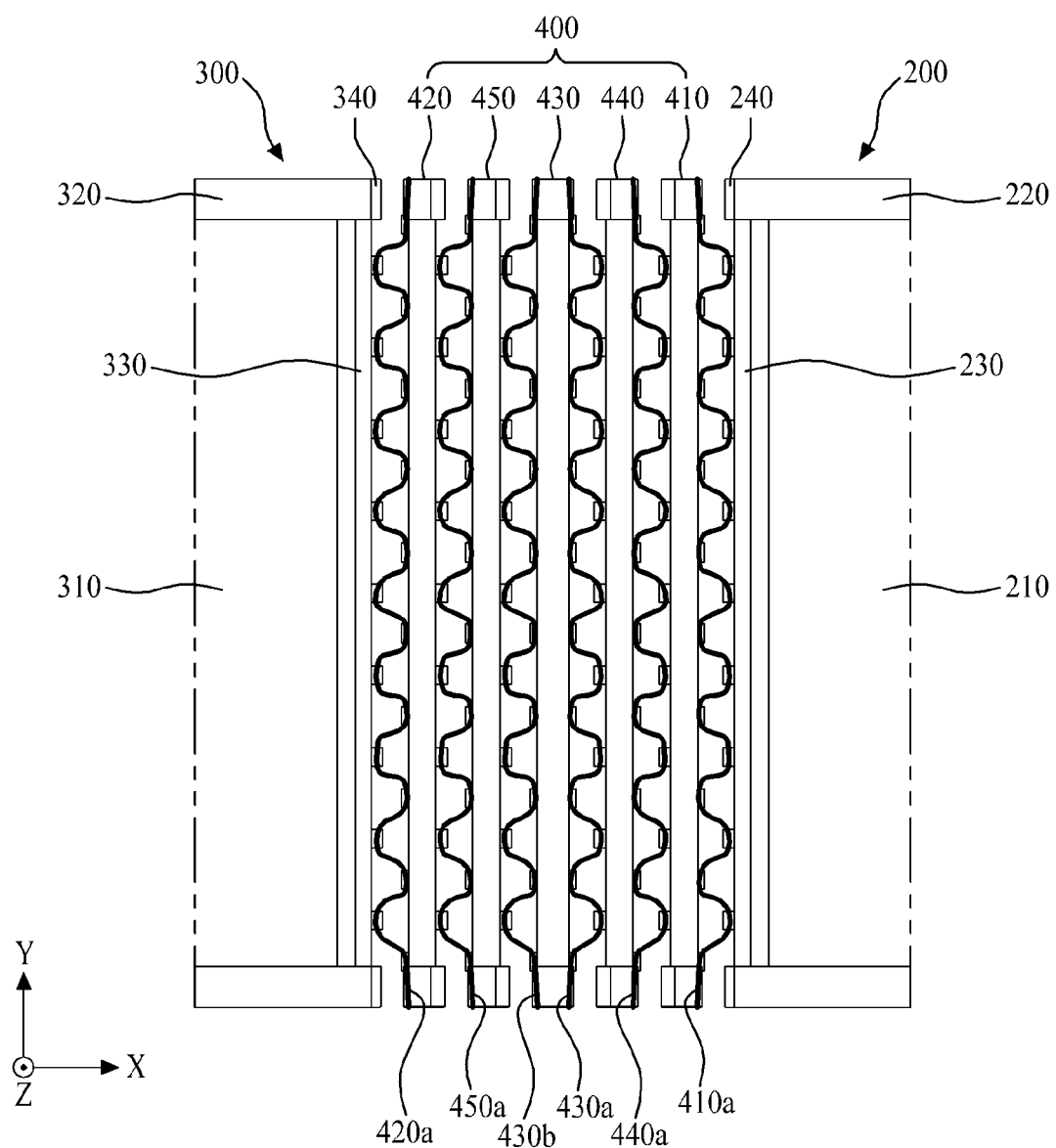
FIG. 9 illustrates first to sixth elastic axis members shown in FIG. 3.

FIG. 9 illustrates the first to sixth elastic axis members shown in FIG. 3, which shows the changed states of the first to sixth elastic axis members in accordance with the folding of the flexible display panel.

Referring to FIG. 9 in connection with FIGS. 3 to 5, each of the first to sixth elastic axis members 410a, 420a, 430a, 430b, 440a and 450a according to one example may be an elastic body with an elastic restoring force, for example, coil spring.

The first elastic axis member 410a is alternately inserted between the first rear cover 200 and the first rear hinge cover 410. That is, after the first elastic axis member 410a is inserted into the third axis supporting hole 412 prepared in the first rear hinge cover 410, the first elastic axis member 410a is alternately inserted into the plurality of first axis supporting holes 252 prepared in the first rear cover 200 and the plurality of fourth axis supporting holes 415a prepared in the first rear hinge cover 410 to support the first rear cover 200 and the first rear hinge cover 410.

When the flexible display panel 100 is folded, the first elastic axis member 410 is changed to the zigzag shape between the first rear cover 200 and the first rear hinge cover 410 in accordance with the rotation angle of each of the first rear cover 200 and the first rear hinge cover 410, whereby the first rear cover 200 and the first rear hinge cover 410 are rotated without separation. When the flexible display panel 100 is unfolded, the first elastic axis member 410a provides the elastic restoring force to the first rear cover 200 and the first rear hinge cover 410, whereby the plurality of first outer connection protrusions 415 prepared in the first rear hinge cover 410 and the plurality of first cover protrusions 240 prepared in the first rear cover 200 are engaged and rotated without separation.

The fifth elastic axis member 440a is alternately inserted between the fourth rear hinge cover 440 and the first rear hinge cover 410. That is, after the fifth elastic axis member 440a is inserted into the third axis supporting hole 412a prepared in the fourth rear hinge cover 440, the fifth elastic axis member 440a is alternately inserted into the plurality of fifth axis supporting holes 416a prepared in the first rear hinge cover 410 and the plurality of fourth axis supporting holes 415a prepared in the fourth rear hinge cover 440 to support the fourth rear hinge cover 440 and the first rear hinge cover 410.

When the flexible display panel 100 is folded, the fifth elastic axis member 440a is changed to the zigzag shape between the fourth rear hinge cover 440 and the first rear hinge cover 410 in accordance with the rotation angle of each of the fourth rear hinge cover 440 and the first rear hinge cover 410, whereby the fourth rear hinge cover 440 and the first rear hinge cover 410 are rotated without separation. When the flexible display panel 100 is unfolded, the fifth elastic axis member 440a provides an elastic restoring force to the fourth rear hinge cover 440 and the first rear hinge cover 410, whereby the plurality of first inner connection protrusions 416 prepared in the first rear hinge cover 410 and the plurality of first outer connection protrusions 415 prepared in the fourth rear hinge cover 440 are engaged and rotated without separation.

The sixth elastic axis member 450a is alternately inserted between the fifth rear hinge cover 450 and the second rear hinge cover 420. That is, after the sixth elastic axis member 450a is inserted into the sixth axis supporting hole 422a prepared in the fifth rear hinge cover 450, the sixth elastic axis member 450a is alternately inserted into the plurality of eighth axis supporting holes 426a prepared in the second rear hinge cover 420 and the plurality of seventh axis supporting holes 425a prepared in the fifth rear hinge cover 450 to support the fifth rear hinge cover 450 and the second rear hinge cover 420.

When the flexible display panel 100 is folded, the sixth elastic axis member 450a is changed to a zigzag shape between the fifth rear hinge cover 450 and the second rear hinge cover 420 in accordance with the rotation angle of each of the fifth rear hinge cover 450 and the second rear hinge cover 420, whereby the fifth rear hinge cover 450 and the second rear hinge cover 420 are rotated without separation. When the flexible display panel 100 is unfolded, the sixth elastic axis member 450a provides an elastic restoring force to the fifth rear hinge cover 450 and the second rear hinge cover 420, whereby the plurality of second outer connection protrusions 426 prepared in the second rear hinge cover 420 and the plurality of second inner connection protrusions 425 prepared in the fifth rear hinge cover 450 are engaged and rotated without separation.

The third elastic axis member 430a is alternately inserted between the third rear hinge cover 430 and the fourth rear hinge cover 440. That is, after the third elastic axis member 430a is inserted into the ninth axis supporting hole 432a prepared in the third rear hinge cover 430, the third elastic axis member 430a is alternately inserted into the plurality of fifth axis supporting holes 416a prepared in the fourth rear hinge cover 440 and the plurality of eleventh axis supporting holes (not shown) prepared in the third rear hinge cover 430 to support the fourth rear hinge cover 440 and the third rear hinge cover 430.

When the flexible display panel 100 is folded, the third elastic axis member 430a is changed to a zigzag shape between the fourth rear hinge cover 440 and the third rear hinge cover 430 in accordance with the rotation angle of each of the fourth rear hinge cover 440 and the third rear hinge cover 430, whereby the fourth rear hinge cover 440 and the third rear hinge cover 430 are rotated without separation. When the flexible display panel 100 is unfolded, the third elastic axis member 430a provides an elastic restoring force to the fourth rear hinge cover 440 and the third rear hinge cover 430, whereby the plurality of third outer connection protrusions 435 prepared in the third rear hinge cover 430 and the plurality of first inner connection protrusions 416 prepared in the fourth rear hinge cover 440 are engaged and rotated without separation.

The fourth elastic axis member 430b is alternately inserted between the third rear hinge cover 430 and the fifth rear hinge cover 450. That is, after the fourth elastic axis member 430b is inserted into the tenth axis supporting hole 432b prepared in the third rear hinge cover 430, the fourth elastic axis member 430b is alternately inserted into the plurality of eighth axis supporting holes 426a prepared in the fifth rear hinge cover 450 and the plurality of twelfth axis supporting holes 436a prepared in the third rear hinge cover 430 to support the fifth rear hinge cover 450 and the third rear hinge cover 430.

When the flexible display panel 100 is folded, the fourth elastic axis member 430b is changed to a zigzag shape between the fifth rear hinge cover 450 and the third rear hinge cover 430 in accordance with the rotation angle of each of the fifth rear hinge cover 450 and the third rear hinge cover 430, whereby the fifth rear hinge cover 450 and the third rear hinge cover 430 are rotated without separation. When the flexible display panel 100 is unfolded, the fourth elastic axis member 430b provides an elastic restoring force to the fifth rear hinge cover 450 and the third rear hinge cover 430, whereby the plurality of third inner connection protrusions 436 prepared in the third rear hinge cover 430 and the plurality of second outer connection protrusions 426 prepared in the fifth rear hinge cover 450 are engaged and rotated without separation.

Figure 10A:
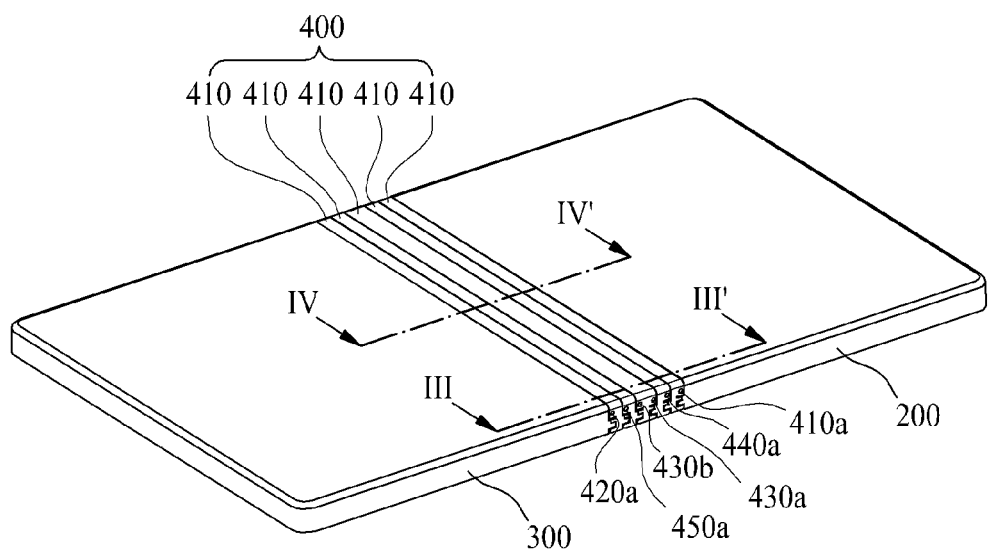
FIG. 10A is a rear perspective view illustrating an unfolded state of the foldable display apparatus according to one embodiment.
Figure 10B:
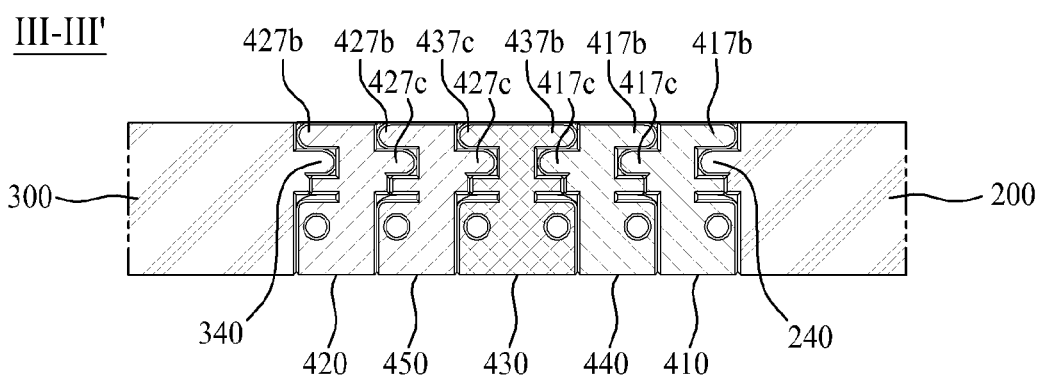
FIG. 10B is a cross sectional view taken along line of FIG. 10A.
Figure 10C:
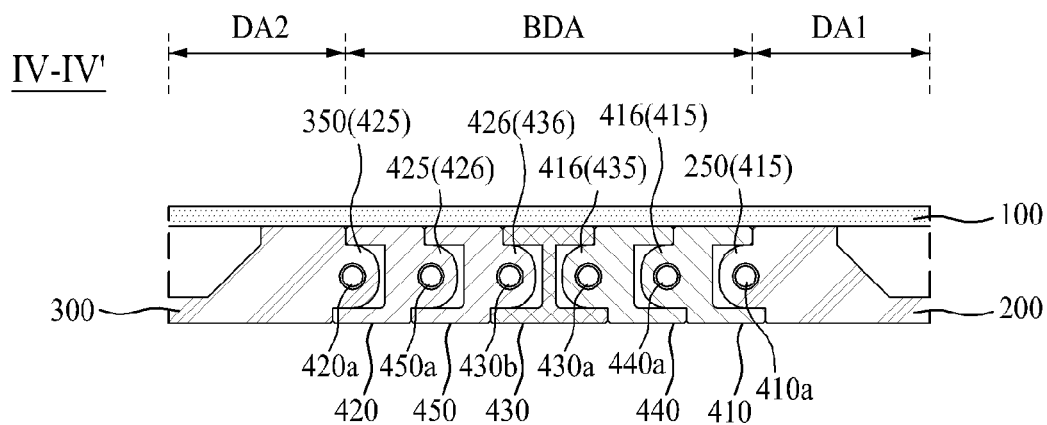
FIG. 10C is a cross sectional view taken along line IV-IV' of FIG. 10A.

FIG. 10A is a rear perspective view illustrating the unfolded state of the foldable display apparatus according to one embodiment of the present invention. FIG. 10B is a cross sectional view along of FIG. 10A. FIG. 10C is a cross sectional view along IV-IV' of FIG. 10A. Hereinafter, the unfolded state of the foldable display apparatus according to one embodiment of the present invention will be described with reference to FIGS. 10A, 10B and 10C.

As shown in FIG. 10A, in case of the foldable display apparatus according to one embodiment of the present invention, when the first and second rear covers 200 and 300 are unfolded, the first and second display area and the bending display area of the flexible display panel are unfolded by the elastic restoring force of each of the first to sixth elastic axis members 410a, 420a, 430a, 430b, 440a and 450a of the hinge 400 to realize a large-sized screen.

As shown in FIG. 10B, when the first and second rear covers 200 and 300 are unfolded, the portion protrusions 240, 340, 417b, 417c, 427b, 427c, 437b and 437c prepared in the first to fifth rear hinge covers 410, 420, 430, 440 and 450 and the first and second rear covers 200 and 300 are overlapped with each other, and are engaged in an up-and-down direction. Accordingly, the first to fifth rear hinge covers 410, 420, 430, 440 and 450 are supported by the first portion protrusion 240 of the first rear cover 200 and the second portion protrusion 340 of the second rear cover 300, whereby the first to fifth rear hinge covers 410, 420, 430, 440 and 450 are maintained in the flat state. Thus, both sides of the bending display area BDA defined in the flexible display panel 100 are supported by the connection protrusions 417b, 427b and 437b prepared in the first to fifth rear hinge covers 410, 420, 430, 440 and 450 to maintain the flat state.

As shown in FIG. 10C, when the first and second rear covers 200 and 300 are unfolded, the connection protrusions 250, 350, 415, 425, 426, 435 and 436 prepared in the first and second rear covers 200 and 300 and the first to fifth rear hinge covers 410, 420, 430, 440 and 450 are alternately engaged by the elastic restoring force of the first to sixth elastic axis members 410a, 420a, 430a, 430b, 440a and 450a. Accordingly, the first to fifth rear hinge covers 410, 420, 430, 440 and 450 are supported by the first cover protrusion 250 of the first rear cover 200 and the second cover protrusion 350 of the second rear cover 300 to maintain the flat state. Thus, the central portion of the bending display area BDA defined in the flexible display panel 100, except both sides of the bending display area BDA, is supported by the upper supporting bars 414, 424 and 434 of the first to fifth rear hinge covers 410, 420, 430, 440 and 450 shown in FIGS. 6 to 8 to maintain the flat state.

Figure 11A:
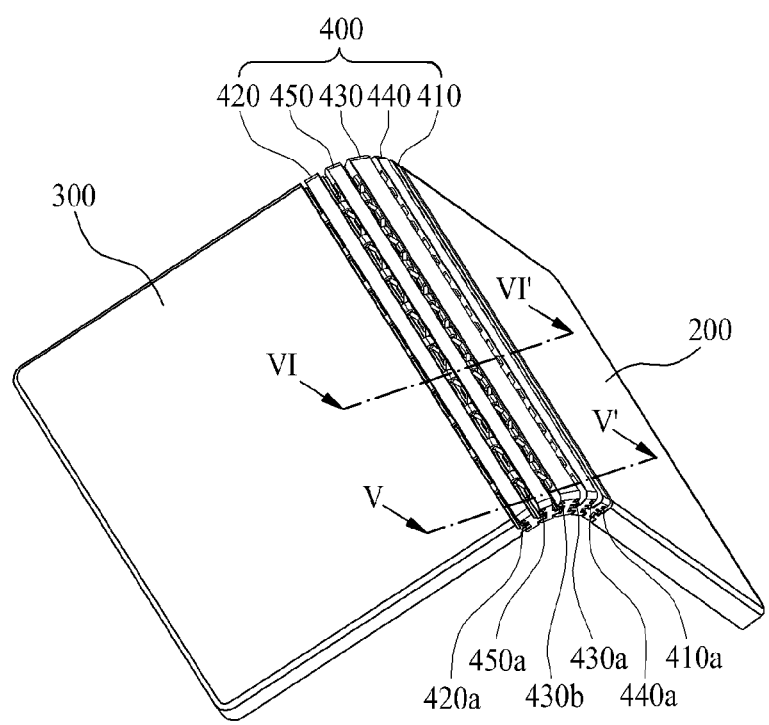
FIG. 11A is a rear perspective view illustrating the foldable display apparatus in a half-folded state according to one embodiment.
Figure 11B:
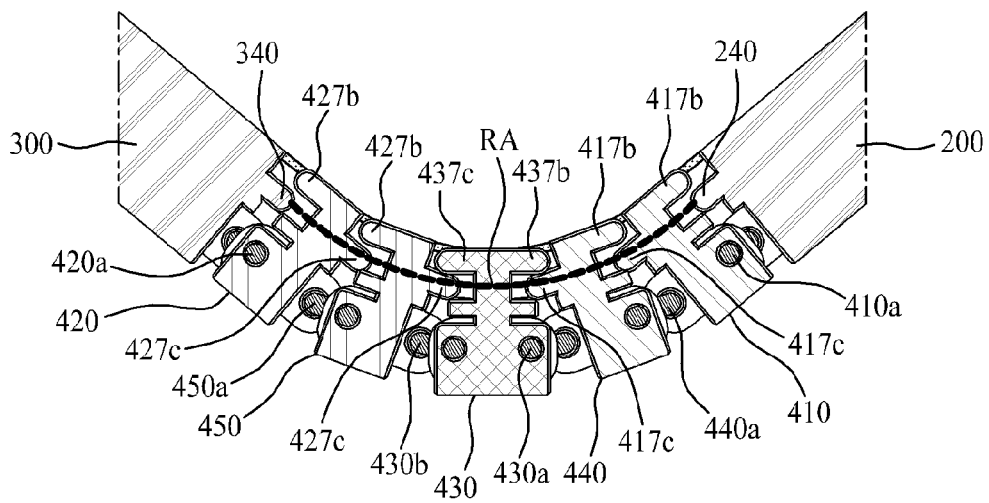
FIG. 11B is a cross sectional view taken along line V-V' of FIG. 11A.
Figure 11C:
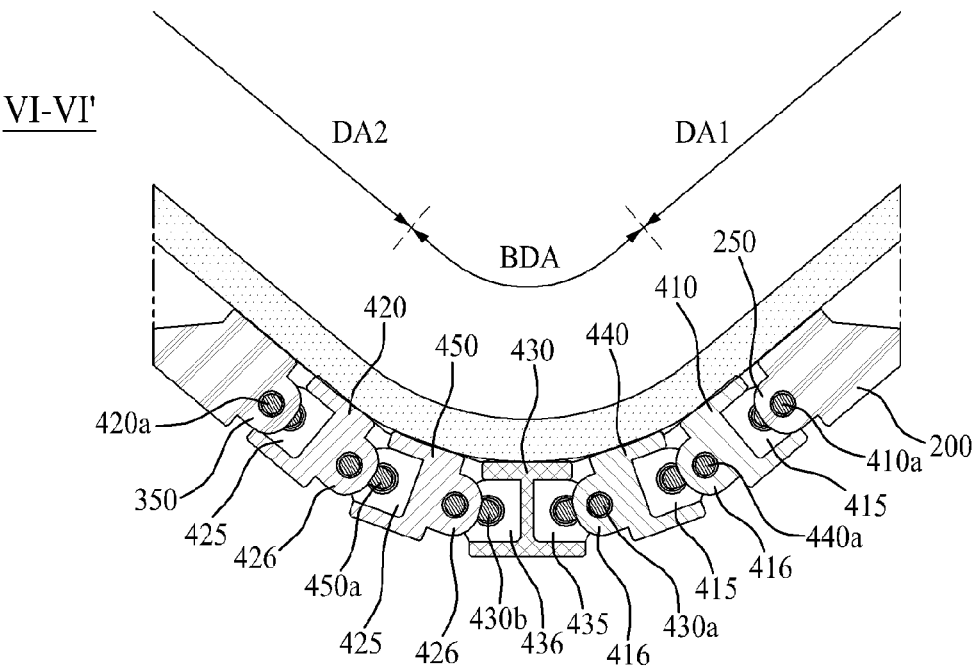
FIG. 11C is a cross sectional view taken along line VI-VI' of FIG. 11A.

FIG. 11A is a rear perspective view illustrating the foldable display apparatus in a half-folded state according to one embodiment of the present invention. FIG. 11B is a cross sectional view along V-V' of FIG. 11A. FIG. 11C is a cross sectional view along VI-VI' of FIG. 11A Hereinafter, the half-folding state of the foldable display apparatus according to one embodiment of the present invention will be described in detail as follows.

As shown in FIG. 11A, in case of the foldable display apparatus according to one embodiment of the present invention, if the first and second rear covers 200 and 300 are rotated to face with each other, the first to sixth elastic axis members 410a, 420a, 430a, 43b, 440a and 450a are changed to the zigzag shape in accordance to the rotation angle of each of the first and second rear covers 200 and 300, whereby the first and fourth rear hinge covers 410 and 440 are rotated in a first rotation direction with respect to a rotation axis of the third rear hinge cover 430, and the second and fifth rear hinge covers 420 and 450 are rotated in a second rotation direction which is opposite to the first rotation direction. Thus, according as the interval between each of the first to fifth rear hinge covers 410, 420, 430, 440 and 450 is gradually increased, the first to fifth rear hinge covers 410, 420, 430, 440 and 450 are spaced apart from each other in a curve shape to form a bending guide surface. Accordingly, the bending display area BDA of the flexible display panel is folded with a predetermined curvature along the bending guide surface.

As shown in FIG. 11B, when the first and second rear covers 200 and 300 are half-folded, the first to fifth rear hinge covers 410, 420, 430, 440 and 450 are respectively rotated in accordance with the shape change of the first to sixth elastic axis members 410a, 420a, 430a, 430b, 440a and 450a. At this time, under the condition that each of the protrusions 240, 340, 417c and 427c prepared in the first to fifth rear hinge covers 410, 420, 430, 440 and 450 and the first and second rear covers 200 and 300 is used as a rotation axis RA, the first and fourth rear hinge covers 410 and 440 are rotated in a first rotation direction with respect to a rotation central axis of the third rear hinge cover 430, and the second and fifth rear hinge covers 420 and 450 are rotated in a second rotation direction with respect to a rotation central axis of the third rear hinge cover 430. Thus, the first to fifth rear hinge covers 410, 420, 430, 440 and 450 are spaced apart from each other in a curve shape to form a bending guide surface of the curved shape. Accordingly, the bending display area BDA of the flexible display panel is folded with a predetermined curvature along the bending guide surface.

As shown in FIG. 11C, when the first and second rear covers 200 and 300 are half-folded, the connection protrusions 250, 350, 415, 425, 426, 435 and 436 prepared in the first and second rear covers 200 and 300 and the first to fifth rear hinge covers 410, 420, 430, 440 and 450 are alternately spaced from each other in accordance with the shape change of the first to sixth elastic axis members 410a, 420a, 430a, 430b, 440a and 450a. Accordingly, the upper supporting bars 414, 424 and 434 of the first to fifth rear hinge covers 410, 420, 430, 440 and 450 shown in FIGS. 6 to 8 are spaced apart from each other in a curve shape to form a bending guide surface of the curved shape. Accordingly, the bending display area BDA of the flexible display panel is folded with a predetermined curvature along the bending guide surface.

Figure 12A:
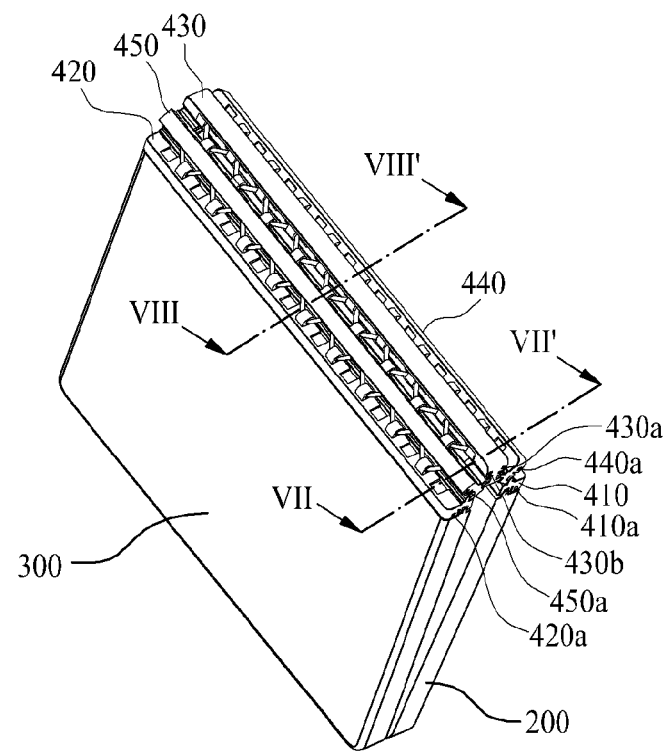
FIG. 12A is a rear perspective view illustrating the foldable display apparatus in a folding state according to one embodiment.
Figure 12B:
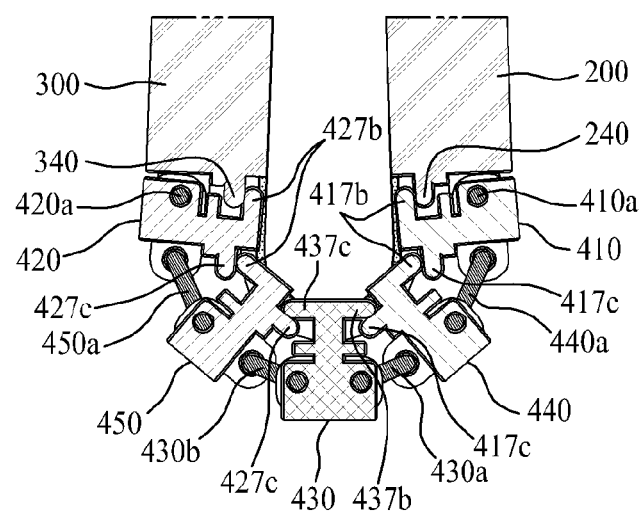
FIG. 12B is a cross sectional view taken along line VII-VII' of FIG. 12A.
Figure 12C:
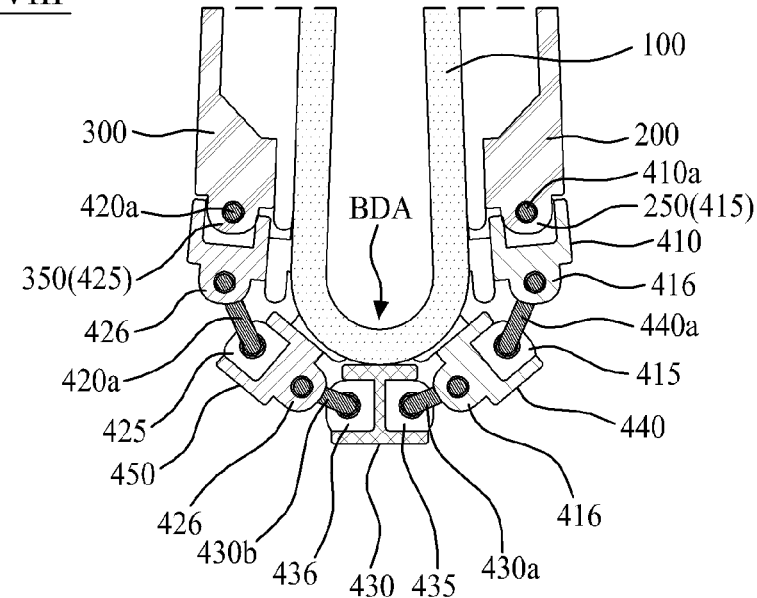
FIG. 12C is a cross sectional view taken along line VIII-VIII' of FIG. 12A.

FIG. 12A is a rear perspective view illustrating the folding state of the foldable display apparatus according to one embodiment of the present invention. FIG. 12B is a cross sectional view along VII-VII' of FIG. 12A. FIG. 12C is a cross sectional view along VIII-VIII' of FIG. 12A. Hereinafter, the folding state of the foldable display device according to one embodiment of the present invention will be described as follows.

As shown in FIG. 12A, in case of the foldable display apparatus according to one embodiment of the present invention, when the first and second rear covers 200 and 300 are additionally rotated and folded, the first to fifth rear hinge covers 410, 420, 430, 440 and 450 are spaced from each other at maximum in accordance with the additional change of zigzag shape of the first to sixth elastic axis members 410a, 420a, 430a, 430b, 440a and 450a to form a bending guide surface of a curved shape. Thus, the bending display area of the flexible display panel is folded with a predetermined curvature along the bending guide surface.

As shown in FIG. 12B, when the first and second rear covers 200 and 300 are folded, the first to fifth rear hinge covers 410, 420, 430, 440 and 450 are rotated at maximum in accordance with the additional shape change of the first to sixth elastic axis members 410a, 420a, 430a, 430b, 440a and 450a of the first to fifth rear hinge covers 410, 420, 430, 440 and 450. At this time, under the condition that each of the portion protrusions 240, 340, 417c and 427c is used as a rotation axis RA, the first and fourth rear hinge covers 410 and 440 are rotated in a first rotation direction with respect to a rotation central axis of the third rear hinge cover 430, and the second and fifth rear hinge covers 420 and 450 are rotated in a second rotation direction with respect to a rotation central axis of the third rear hinge cover 430. Accordingly, the first to fifth rear hinge covers 410, 420, 430, 440 and 450 are spaced from each other at maximum to form a bending guide surface of a curved shape. Thus, the bending display area of the flexible display panel is folded with a predetermined curvature along the bending guide surface.

As shown in FIG. 12C, when the first and second rear covers 200 and 300 are folded, the connection protrusions 250, 350, 415, 425, 426, 435 and 436 are spaced at maximum from each other in accordance with the shape change of the first to sixth elastic axis members 410a, 420a, 430a, 430b, 440a and 450a. Accordingly, in case of the central portion of the bending display area BDA except both sides of the bending display area BDA defined in the flexible display panel 100, the upper supporting bars 414, 424 and 434 of the first to fifth rear hinge covers 410, 420, 430, 440 and 450 shown in FIGS. 6 to 8 are spaced from each other to form a bending guide surface of a curved shape. Thus, the bending display area of the flexible display panel is folded with a predetermined curvature along the bending guide surface.

Meanwhile, the flexible display panel 100, which is folded with the curvature set in accordance with the folding of the first and second rear covers 200 and 300, is semiautomatically unfolded in the flat state in accordance with the elastic restoring force of the first to sixth elastic axis members 410a, 420a, 430a, 430b, 440a and 450a which are changed from a zigzag type to a straight-line shape when the first and second rear covers 200 and 300 are unfolded.

In the foldable display apparatus according to one embodiment of the present invention, when the flexible display panel is folded, the interval between each of the plurality of rear hinge covers is changed in accordance with the shape change of the elastic axis member, whereby the bending guide surface of the curved line shape is formed so that it is possible to prevent the flexible display panel from being bent when the flexible display panel is folded or unfolded, thereby improving reliability of the flexible display panel.

Figure 13:
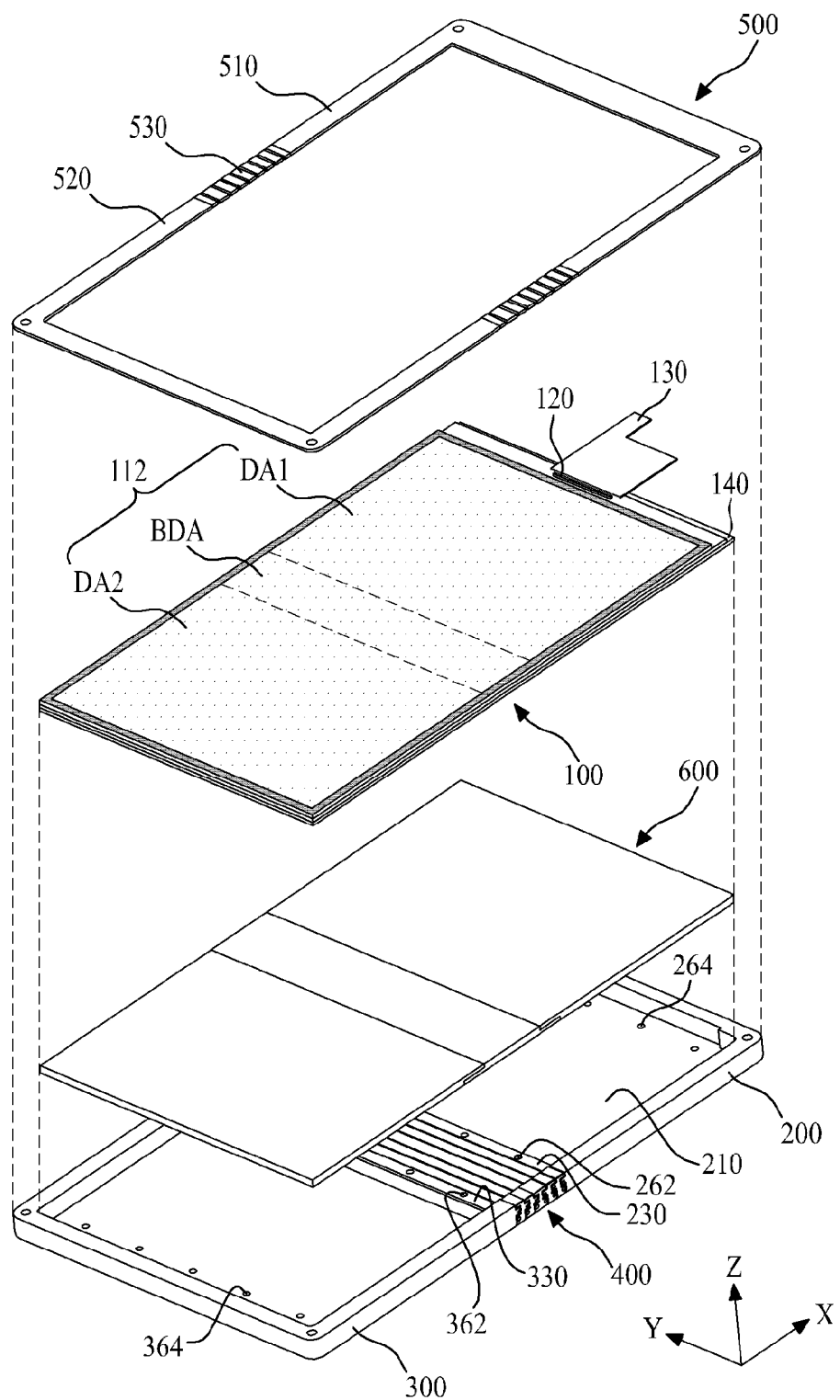
FIG. 13 is an exploded perspective view illustrating a foldable display apparatus according to another embodiment.
Figure 14:
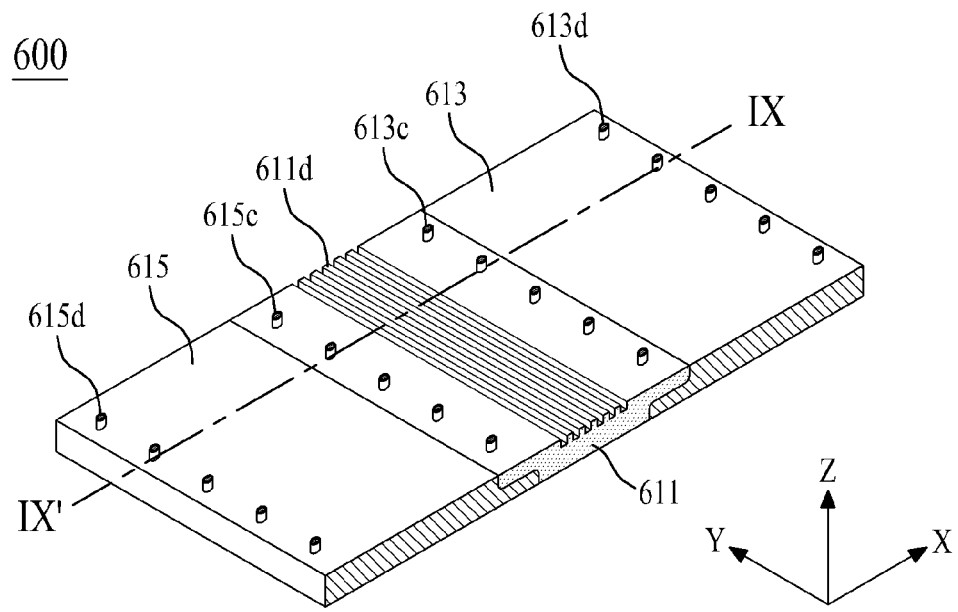
FIG. 14 is a rear perspective view illustrating a panel supporting frame of FIG. 13.
Figure 15:
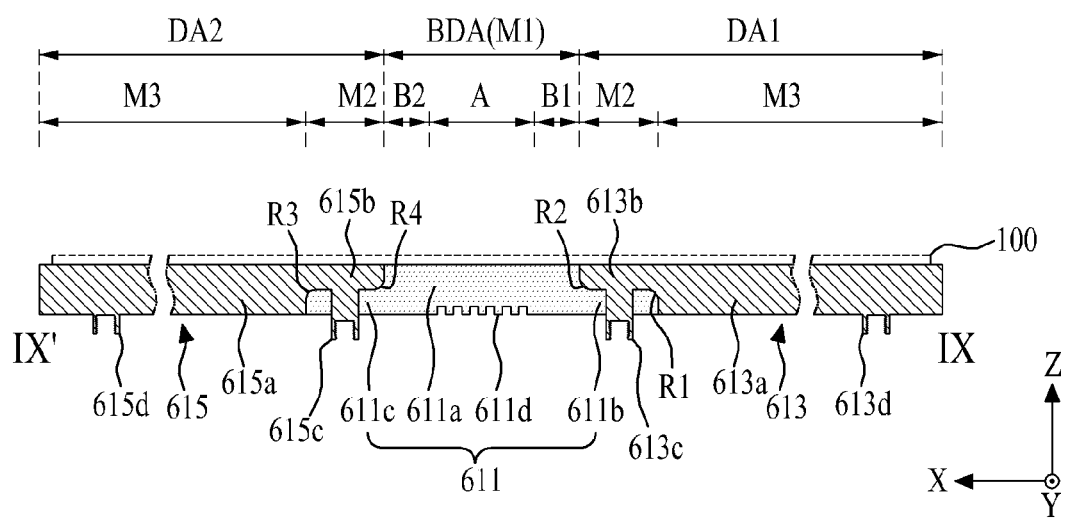
FIG. 15 is a cross sectional view taken along line IX-IX' of FIG. 14.

FIG. 13 is an exploded perspective view illustrating a foldable display apparatus according to another embodiment. The embodiment of FIG. 13 additionally providing a panel supporting frame. FIG. 14 is a rear perspective view of a panel supporting frame shown in FIG. 13. FIG. 15 is a cross sectional view along IX-IX' of FIG. 1. Hereinafter, only the structure relating the panel supporting frame will be described in detail as follows.

Referring to FIGS. 13 to 15, the panel supporting frame 600 according to one example is connected with first and second areas of the aforementioned flexible display panel 100 to support a bending display area BDA. The panel supporting frame 600 according to one example is received in first and second rear covers 200 and 300. That is, the panel supporting frame 600 is connected with a rear side of the flexible display panel 100, wherein the panel supporting frame 600 guides folding and unfolding of the flexible display panel 100 with respect to the bending display area BDA. To this end, the panel supporting frame 600 according to one example may include a bending member 611 and first and second supporting members 613 and 615.

The bending member 611 supports the bending display area BDA of the flexible display panel 100. The bending member 611 guides the bending display area BDA of the flexible display panel 100 to be bent with a predetermined curvature. The bending member 611 is not physically connected with the flexible display panel 100 by the use of adhesive member (not shown) such as adhesive or double-sided tape. The bending member 611 serves as a supporter for supporting a panel bending portion overlapped with the bending display area BDA of the flexible display panel 100. To this end, the bending member 611 may include any one material or two or more materials of soft materials, for example, rubber, silicon, polyurethane and polyvinyl chloride.

The bending member 611 according to one example may include a body 611a, a first outer protrusion 611b and a second outer protrusion 611c.

The body 611a is overlapped with the bending display area BDA of the flexible display panel 100, wherein the body 611a supports the bending display area BDA of the flexible display panel 100 or guides the bending of the bending display area BDA. The body 611a according to one example may include a bending portion (A) and first and second bending buffers (B1, B2).

The bending portion (A) is defined with the center of the body 611a, and is overlapped with the bending display area BDA of the flexible display panel 100. The bending portion (A) is formed of a soft material so that the bending portion (A) is bent in accordance with the bending of the bending display area BDA. A length of the bending portion (A) may be set to be identical to a length of the bending display area BDA defined in the flexible display panel 100 with respect to a length direction (X) of the flexible display panel 100, or may be set in accordance with the bending curvature of the bending display area BDA. For example, a first length of the bending portion (A) is set in accordance with a folded radius circumference. A maximum length of the bending portion (A) is set to be 30% or more than 30% of the radius circumference so as to provide the smooth curvature, and also set to be less than 180% of the radius circumference so as to maintain hardness of the bending member 611, preferably.

The first and second bending buffers (B1, B2) are bending buffer areas, wherein the first and second bending buffers (B1, B2) are prepared in both sides of the bending portion (A) while being in parallel to each other. The first and second bending buffers (B1, B2) may be overlapped with inner sides of display areas (DA1, DA2) being in contact with the bending display area BDA of the flexible display panel 100. The first bending buffer (B1) is prepared at one side of the body 11a, that is, one side of the bending portion (A), and the second bending buffer (B2) is prepared at the other side of the body 11a, that is, the other side of the bending portion (A). In this case, a second length of each of the first and second bending buffers (B1, B2) is set within a range of 10%~70% of the length of the bending portion (A) so as to maintain hardness of the bending member 611, preferably. Each of the first and second bending buffers (B1, B2) is formed of a soft material so that it is possible to maintain the smooth curvature of the bending display area BDA when the flexible display panel 100 is bent.

The first outer protrusion 611b is prepared at one side of the body 611a, and is overlapped with the first supporting member 613. The first outer protrusion 611b according to one example, which protrudes toward the first supporting member 13, has a predetermined length from one side of the body 611a, and more particularly, a lower portion of a first long side of the body 611a, and then the protruding first outer protrusion 611b is overlapped with the inner side of the first supporting member 613.

The second outer protrusion 611c is prepared at the other side of the body 611a. With the body 11a provided between the first outer protrusion 611b and the second outer protrusion 611c, the second outer protrusion 611c is provided in parallel to the first outer protrusion 611b, and is overlapped with the second supporting member 15. The second outer protrusion 11c according to one example, which protrudes toward the second supporting member 615, has a predetermined length from the other side of the body 611a, and more particularly, a lower portion of a second long side of the body 611a, and then the protruding second outer protrusion 611c is overlapped with the inner side of the second supporting member 615.

Additionally, the bending member 611 according to the first embodiment of the present invention may further include a length compensation pattern 611d prepared in a lower surface of the body 611a in opposite to an upper surface of the body 611a, wherein the upper surface of the body 611a directly confronts the flexible display panel 100.

The length compensation pattern 611d may be an uneven pattern with a plurality of hollows in the lower surface of the body 11a, wherein the plurality of hollows included in the uneven pattern may be provided at fixed intervals along a length direction X (or a short-side direction) of the body 611a while being in parallel to a width direction Y (or a long-side direction) of the body 611a. The uneven pattern 611d according to one example may include a plurality of slits, wherein each of the slits may have a predetermined width, and the plurality of slits included in the uneven pattern 611d may be provided in parallel to the long side of the body 611a and are provided in the lower surface of the bending portion (A). The length compensation pattern 611d compensates for a length change through a change of interval between the adjacent slits when the flexible display panel 100 is repetitively folded or unfolded so that it is possible to prevent the bending display area BDA of the flexible display panel 100 from being wrinkled, and to make the bending display area BDA of the flexible display panel 100 be bent with the predetermined curvature. A width and depth of each of the slits may be set in accordance with the bending curvature of the bending display area BDA.

Additionally, the length compensation pattern 611d may be prepared in the upper surface of the body 611a, that is, a supporting surface of the body 611a for supporting the bending display area BDA of the flexible display panel 100. In this case, the uneven pattern may cause a sense of difference on a touch for the flexible display panel 100. Accordingly, the length compensation pattern 611d is prepared in the lower surface of the body 611a, preferably.

The first supporting member 613, which is connected with one side of the bending member 11, supports the first display area (DA1) of the flexible display panel 100. The inner lateral side of the first supporting member 613 and one side of the bending member 611 are overlapped with each other, and are physically connected with each other as one body. Also, the first supporting member 613 is physically connected with a first panel rear portion of the flexible display panel 100 overlapped with the first display area (DA1) of the flexible display panel 100, whereby the first panel rear portion is maintained in the flat state. To this end, the first supporting member 613 is formed of a hard material whose hardness is relatively higher than that of the bending member 611, for example, plastic material or metal material.

The first supporting member 613 according to one example may include a first base plate 613a and a first inner protrusion 613b.

The first base plate 613a is overlapped with the first display area (DA1) of the flexible display panel 100, wherein the first base plate 613a supports the first panel rear portion of the flexible display panel 100. In this case, the first base plate 613a may be physically connected with the first panel rear portion by the use of adhesive member (not shown). An inner lateral side of the first base plate 613a which directly confronts the first outer protrusion 611b of the bending member 611 is physically connected with a lateral side of the first outer protrusion 611b.

The first inner protrusion 613b is prepared at an inner lateral side of the first base plate 613a, overlapped with the first outer protrusion 611b of the bending member 611, and physically connected with the upper surface of the first outer protrusion 611b and one lateral side of the body 611a. The first inner protrusion 613b, which protrudes toward the bending member 611, has a predetermined length from the inner lateral side of the first base plate 613a, and more particularly, an upper portion of an inner short side of the first base plate 613a, and then the protruding first inner protrusion 613b is overlapped with the first outer protrusion 611b of the bending member 611. In this case, the first inner protrusion 613b and the first outer protrusion 611b may have the same length. A length in each of the first inner protrusion 613b and the first outer protrusion 611b may be set to be 10% or more than 10% of the length of the bending portion (A) so as to secure a sufficient attachment area (or bonding area) between the bending member 611 and the first supporting member 613, and also to prevent a separation even in a repetitive folding.

The first supporting member 613 according to one example may further include first and second rounding portion (R1, R2) prepared at corners of the first inner protrusion 613b connected with the bending member 611.

The first rounding portion (R1) is prepared with a predetermined curvature at the corner between the first base plate 613a and the first inner protrusion 613b. The first second rounding portion (R2) is prepared with a predetermined curvature at the corner of the first inner protrusion 613b corresponding to the corner between the body 611a of the bending member 611 and the first outer protrusion 611b. The first and second rounding portions (R1, R2) increase the attachment area between the bending member 611 and the first supporting member 613 to enhance an adhesive strength between the bending member 611 and the first supporting member 613.

The second supporting member 615, which is connected with the other side of the bending member 611, supports the second display area (DA2) of the flexible display panel 100. The inner lateral side of the second supporting member 615 and the other side of the bending member 611 are overlapped with each other, and are physically connected with each other as one body. Also, the second supporting member 615 is physically connected with a second panel rear portion of the flexible display panel 100 overlapped with the second display area (DA2) of the flexible display panel 100, whereby the second panel rear portion is maintained in the flat state. To this end, the second supporting member 615 may be formed of the same hard material as that of the first supporting member 613, and the second supporting member 615 may be symmetrical to the first supporting member 613 with respect to the center of the bending portion (A).

The second supporting member 615 according to one example may include a second base plate 615a and a second inner protrusion 615b.

The second base plate 615a is overlapped with the second display area (DA2) of the flexible display panel 100, wherein the second base plate 615a supports the second panel rear portion of the flexible display panel 100. In this case, the second base plate 615a may be physically connected with the second panel rear portion by the use of adhesive member (not shown). An inner lateral side of the second base plate 615a which directly confronts the second outer protrusion 611c of the bending member 611 is physically connected with a lateral side of the second outer protrusion 611c.

The second inner protrusion 615b is prepared at an inner lateral side of the second base plate 615a, overlapped with the second outer protrusion 611c of the bending member 611, and physically connected with the upper surface of the second outer protrusion 611c and the other side of the body 611a. The second inner protrusion 615b, which protrudes toward the bending member 611, has a predetermined length from the inner lateral side of the second base plate 615a, and more particularly, an upper portion of an inner short side of the second base plate 615a, and then the protruding second inner protrusion 615b is overlapped with the second outer protrusion 611c of the bending member 611. In this case, the second inner protrusion 615b and the second outer protrusion 611c may have the same length.

The first supporting member 615 according to one example may further include third and fourth rounding portions (R3, R4) prepared at corners of the second inner protrusion 615b connected with the bending member 611.

The third rounding portion (R3) is prepared with a predetermined curvature at the corner between the second base plate 615a and the second inner protrusion 615b. The fourth rounding portion (R4) is prepared with a predetermined curvature at the corner of the second inner protrusion 615b corresponding to the corner between the body 611a of the bending member 611 and the second outer protrusion 611c. The third and fourth rounding portions (R3, R4) increase the attachment area between the bending member 611 and the second supporting member 615 formed of the different materials to enhance an adhesive strength between the bending member 611 and the second supporting member 615.

Additionally, the panel supporting frame 600 according to the first embodiment of the present invention may further include a plurality of first to fourth bosses 613c, 615c, 613d and 615d.

The first boss 613c protrudes out of the first supporting member 613 and supports one side of the bending member 611. That is, the plurality of first bosses 613c, which pass through the first outer protrusion 611b of the bending member 611, are provided at fixed intervals in the lower surface of the first inner protrusion 613b. The plurality of first bosses 613c protrude out of the lower surface of the first outer protrusion 611b, wherein each of the plurality of first bosses 613c may have a cylinder shape. Each of the plurality of first bosses 613c may include a screw hole prepared in the center at its lower end. According as the plurality of first bosses 613c vertically penetrate through the first outer protrusion 611b of the bending member 611, each of the plurality of first bosses 613c serves as a folding reference point to make the bending member 611 and/or first supporting member 613 folded without twists when the panel supporting frame 610 is folded. Also, each of the plurality of first bosses 613c is connected with the first panel supporting portion 230 of the first rear cover 200 by a coupling member (not shown) such as a screw coupled with the screw hole, whereby the inner lateral side of the first supporting member 613 is connected with the first panel supporting portion 230 of the first rear cover 200. To this end, the first panel supporting portion 230 of the first rear cover 200 is provided with a plurality of first screw through holes 262 overlapped with the plurality of first bosses 613c.

The second boss 615c protrudes out of the second supporting member 615 and supports the other side of the bending member 611. That is, the plurality of second bosses 615c, which pass through the second outer protrusion 611c of the bending member 611, are provided at fixed intervals in the lower surface of the second inner protrusion 615b. The plurality of second bosses 615c protrude out of the lower surface of the second outer protrusion 611c, wherein each of the plurality of second bosses 615c may have a cylinder shape. Each of the plurality of second bosses 615c may include a screw hole prepared in the center at its lower end. According as the plurality of second bosses 615c vertically penetrate through the second outer protrusion 611c of the bending member 611, each of the plurality of second bosses 615c serves as a folding reference point to make the bending member 611 and/or second supporting member 615 folded without twists when the panel supporting frame 610 is folded. Also, each of the plurality of second bosses 615c is connected with the second panel supporting portion 330 of the second rear cover 300 by a coupling member (not shown) such as a screw coupled with the screw hole, whereby the inner lateral side of the second supporting member 615 is connected with the second panel supporting portion 330 of the second rear cover 300. To this end, the second panel supporting portion 330 of the second rear cover 300 is provided with a plurality of second screw through holes 362 overlapped with the plurality of second bosses 615c.

The plurality of third bosses 613d protrude from the first supporting member 613. That is, the plurality of third bosses 613d are vertically prepared at fixed intervals from the lower portion of the outer lateral side of the first base plate 613a. Each of the plurality of third bosses 613d may have a cylinder shape. Each of the plurality of third bosses 613d may include a screw hole prepared in the center at its lower end. Each of the plurality of third bosses 613d is connected with the first bottom portion 210 of the first rear cover 200 by a coupling member (not shown) such as a screw coupled with the screw hole, whereby the outer lateral side of the first supporting member 613 is connected with the first bottom portion 210 of the first rear cover 200. To this end, the first bottom portion 210 of the first rear cover 200 is provided with a plurality of third screw through holes 264 overlapped with the plurality of third bosses 613d.

The plurality of fourth bosses 615d protrude from the second supporting member 615. That is, the plurality of fourth bosses 615d are vertically prepared at fixed intervals from the lower surface of the outer lateral side of the second base plate 615a. Each of the plurality of fourth bosses 615d may have a cylinder shape. Each of the plurality of fourth bosses 615d may include a screw hole prepared in the center at its lower end. Each of the plurality of fourth bosses 615d is connected with the second bottom portion 310 of the second rear cover 300 by a coupling member (not shown) such as a screw coupled with the screw hole, whereby the outer lateral side of the second supporting member 615 is connected with the second bottom portion 310 of the second rear cover 300. To this end, the second bottom portion 310 of the second rear cover 300 is provided with a plurality of fourth screw through holes 364 overlapped with the plurality of fourth bosses 615d.

The bending member 611 and the first and second supporting member 613 and 615 may be formed as one body by an insert injection method or double injection method using both soft and hard materials. Accordingly, in case of the panel supporting frame 600 according to the embodiment of the present invention, the first and second supporting members 613 and 615 formed of the hard material are overlapped with and connected with both sides of the bending member 611 formed of the soft material, thereby providing a soft material portion M1, a heterogeneous material portion M2 and a hard material portion M3.

The soft material portion M1 is a single material portion defined by the body 611a of the bending member 611, wherein the soft material portion M1 for supporting the bending display area BDA of the flexible display panel 100 is bent in accordance with the bending of the bending display area BDA.

The heterogeneous material portion M2 corresponds to a combined portion of the soft material and the hard material, that is, an overlapped portion between the bending member 611 and each of the first and second supporting members 613 and 615. The heterogeneous material portion M2 minimizes a sense of difference in the touch on the boundary between the soft material and the hard material, and also increases an attachment area between the soft material and the hard material to enhance formability and adhesiveness between the soft material and the hard material.

The hard material portion M3 is a single material portion defined by the base plates 613a and 615a of the first and second supporting members 613 and 615, wherein the hard material portion M3 secures hardness of the flexible display panel 100 and maintains flatness of the flexible display panel 100.

In case of the panel supporting frame 600 according to one embodiment of the present invention, the attachment area between the bending member 611 and the supporting members 613 and 615 is largely increased owing to the connection portion formed by overlapping and connecting the bending member 611 of the soft material and each of the first and supporting member 613 and 615 of the hard material, whereby it is possible to prevent the bending member 611 and the supporting members 613 and 615 from being separated from each other even in case of the repetitive folding and unfolding. Also, the panel supporting frame 600 according to one embodiment of the present invention is physically connected with the lower surface of the flexible display panel 100 so that it is possible to maintain hardness of the flexible display panel 100, to stably protect the flexible display panel 100 even when the flexible display panel 100 is repetitively folded, to maintain the bending curvature of the bending display area BDA when the flexible display panel 100 is folded, and to maintain the flexible display panel 100 in the flat state by the stable supporting of the bending display area BDA when the flexible display panel 100 is unfolded. The panel supporting frame 600 according to one embodiment of the present invention is physically connected with and formed as one body with the lower surface of the flexible display panel 100 except the bending display area BDA so that it is possible to facilitate a transfer of the flexible display panel 100, and to improve an assembly between the flexible display panel 100 and the housing.

Figure 16:
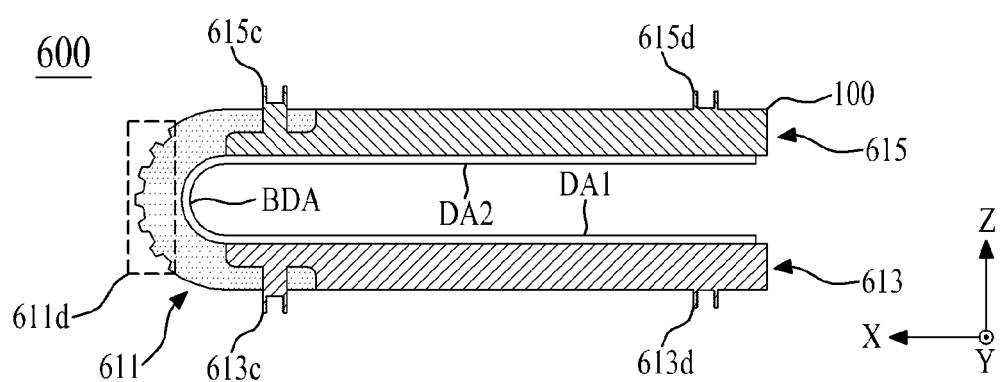
FIG. 16 illustrates a panel supporting frame in a folded state according to one embodiment.

FIG. 16 shows a folding state of the panel supporting frame according to one embodiment of the present invention.

Referring to FIG. 16, in case of the panel supporting frame 600 according to one embodiment of the present invention, the first and second supporting members 613 and 615 of the hard material are respectively overlapped with and connected with both sides of the bending member 611 of the soft material, whereby the flexible display panel 100 is bent in an inside bending method through the bending of the bending member 611. In this case, the inside bending method indicates that the first and second display areas DA1 and DA2 directly confront each other when the flexible display panel 100 is folded. For example, according as the first and second rear covers 200 and 300 are folded, the second supporting member 615 is folded onto the first supporting member 613 by the inside bending of the bending member 611 so that the bending display area BDA of the flexible display panel 100 is bent with the predetermined curvature, and the first and second display areas DA1 and DA2 of the flexible display panel 100 directly confront each other.

The bosses 613c and 615c prepared in the first and second supporting members 613 and 615 make the flexible display panel 100 folded without twists when the flexible display panel 100 is folded. When the flexible display panel 100 is folded, the interval between the adjacent slits prepared in the length compensation pattern 611d of the bending member 611 is increased in accordance with a tensile force occurring in the lower surface of the bending member 611 so that a length change of the bending member 611 is compensated, and thus the bending display area BDA of the flexible display panel 100 is bent in accordance with the smooth curvature without wrinkles.

Accordingly, the foldable display apparatus according to another embodiment of the present invention may have the same effect as that of the foldable display apparatus according to one embodiment of the present invention. Especially, the panel supporting frame 600 for supporting the flexible display panel 100 is connected with the first and second rear covers 200 and 300 so that it is possible to minimize a sense of difference in the touch on the display areas DA1 and DA2 and the bending display area BDA of the flexible display panel 100, to reinforce hardness of the flexible display panel 100 by the use of panel supporting frame 600, and also to maintain the flat state of the bending display area BDA in the folded flexible display panel.

According to the present invention, the flexile display panel is folded and unfolded without bending according as the interval between each of the plurality of rear hinge covers engaged and connected with each other is changed in accordance with the folding or unfolded state of the flexible display panel to improve reliability of the flexible display panel.

Also, the folded flexible display panel is unfolded in the flat state according to the elastic restoring force of the plurality of elastic axis members so that it is possible to improve a user's ease for folding and unfolding processes of the flexible display panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A foldable display apparatus, comprising:
a flexible display panel comprising a first flat display area, a second flat display area and a bending display area between the first flat display area and the second flat display area;
a first rear cover configured to provide support for the first flat display area, the first rear cover having a first edge;
a second rear cover configured to provide support for the second flat display area, the second rear cover having a second edge facing the first edge in an unfolded state of the foldable display apparatus; and
a hinge between the first rear cover and the second rear cover, the hinge configured to support the bending display area and comprising:
a plurality of rear hinge members between the first edge and the second edge, the plurality of rear hinge members interlocking with each other in the unfolded state and rotated around each other from the unfolded state into a folded state, and
a plurality of elastic axis members configured to couple the plurality of rear hinge members, the first edge and the second edge, wherein the plurality of elastic axis members are deformed as the rear hinge members are rotated around each other by bending of the flexible display panel,
wherein the plurality of rear hinge members comprises:
a first rear hinge member coupled to the first edge via a first elastic axis member of the plurality of elastic axis members,
a second rear hinge member coupled to the second edge via a second elastic axis member of the plurality of elastic axis members, and
a third rear hinge member coupled between the first rear hinge member and the second rear hinge member, and
wherein the first rear hinge member comprises first inner connection protrusions with holes for receiving the first axis member and the first edge comprises first cover protrusions with holes for receiving the first elastic axis member, and wherein the second rear hinge member comprises second inner connection protrusions with holes for receiving the second axis member and the second edge comprises second cover protrusions with holes for receiving the second elastic axis member.

2. The foldable display apparatus of claim 1, wherein deformation of the elastic axis members in the folded state of the foldable display apparatus is greater than deformation of the elastic axis members in the unfolded state.

3. The foldable display apparatus of claim 1, further comprising:
a fourth rear hinge member coupled to the third rear hinge member via a third elastic axis member of the plurality of elastic axis members, and coupled to the first rear hinge member via a fourth elastic axis member; and
a fifth rear hinge member coupled to the third rear hinge member via a fifth elastic member, and coupled to the second rear hinge member via a sixth elastic axis member.

4. The foldable display apparatus of claim 3, wherein each of the plurality of rear hinge members comprises a center rear hinge member in a middle of the hinge, both lateral sides of the center rear hinge member are formed with protrusion insertion space to receive support sidewalls extending from two of the subset of rear hinge members adjacent to the center rear hinge member.

5. The foldable display apparatus of claim 1, wherein each of a subset of the plurality of the rear hinge members comprises:
a first supporting bar extending parallel to the first edge or the second edge and having an upper surface configured to provide support for a portion of the bending display area; and
a first rotation axis portion having a first inner portion protrusion inserted into first protrusion insertion space in another rear hinge member as the hinge is unbent, and the first inner portion protrusion retracted from the first protrusion insertion space as the hinge is bent.

6. The foldable display apparatus of claim 5, wherein each of the subset of the plurality of the rear hinge members comprises:
a second supporting bar extending parallel to the first edge or the second edge; and
a second rotation axis portion at an opposite longitudinal side of the first rotation axis portion, the second rotation axis portion having a second inner portion protrusion inserted into second protrusion insertion space in the other rear hinge member as the hinge is unbent, and the second inner portion protrusion retracted from the second protrusion insertion space as the hinge is bent.

7. The foldable display apparatus of claim 6, wherein each of the subset of the rear hinge member comprises outer connection protrusions with holes for receiving one of the elastic axis members, and inner connection protrusions with holes for receiving another of the elastic axis members.

8. The foldable display apparatus of claim 7, wherein an inner connection protrusion of one of the rear hinge members is placed between (i) two of a plurality of cover protrusions extending from the first edge or (ii) two of a plurality of cover protrusions of another rear hinge member.

9. The foldable display apparatus of claim 8, wherein each of the cover protrusions has a hole for receiving the other of the elastic axis members.

10. The foldable display apparatus of claim 7, wherein each of the subset of the rear hinge member further comprises a plurality of central supporting bars between the first and second supporting bars, the outer connection protrusions and the inner connection protrusions attached to the central supporting bars.

11. The foldable display apparatus of claim 1, wherein each of the plurality of rear hinge members, the first edge and the second edge have a same length.

12. The foldable display apparatus of claim 1, further comprising a panel supporting frame between (i) the flexible display panel and (ii) surfaces of the first rear cover, the second rear cover and the hinge, wherein the panel supporting frame is configured to guide folding or unfolding of the bending display area.

13. The foldable display apparatus of claim 12, wherein the panel support frame comprises a first supporting member, a second supporting member and a bending member between the first supporting member and the second supporting member.

14. The foldable display apparatus of claim 13, wherein the bending member comprises a patterned surface facing the hinge and a smooth surface facing the bending display area, the patterned surface including grooves extending parallel to the first and second edges.

15. The foldable display apparatus of claim 14, wherein the first supporting member comprises a first line of bosses for coupling to the first rear cover, and wherein the second supporting member comprises a second line of bosses for coupling to the second rear cover.

16. The foldable display apparatus of claim 13, wherein the bending member comprises a first outer protrusion overlapping with a portion of the first supporting member and a second outer protrusion overlapping with a portion of the second supporting member, bosses from the portions of the first and second supporting members extending through the bending member.

17. The foldable display apparatus of claim 16, further comprising screws inserted into the bosses to secure the bending member to the first and second supporting members, wherein the bosses are aligned along a line parallel to the first and second edges to guide bending of the panel supporting member.

18. The foldable display apparatus of claim 1, wherein each of the plurality of rear hinge members has a first surface providing support for the bending display area and a second surface at an opposite side of the first surface, wherein an increase of a first distance between two first surfaces of adjacent rear hinge members is different than an increase of a second distance between two second surfaces of the adjacent rear hinge members responsive to rotating the rear hinge members from the unfolded state into a folded state.

19. A method of operating a foldable display apparatus, comprising:
  bending a hinge between a first rear cover providing support for a first flat display area of a flexible display panel and a second rear cover providing support for a second flat display area of the flexible display panel to fold the foldable display apparatus, the hinge configured to provide support for a bending area of the flexible display panel between the first and second flat display area;
  responsive to bending of the hinge:
  increasing deformation of a plurality of elastic axis members coupling a plurality of rear hinge members of the hinge in an interlocking manner in an unfolded state, and
  rotating the rear hinge members around each other from the unfolded state;
  unbending the hinge to unfold the foldable display from a folded state; and
  responsive to unbending of the hinge:
  decreasing deformation of the plurality of elastic axis members, and
  rotating the rear hinge members around each other from the folded state,
  wherein the plurality of rear hinge members comprises:
  a first rear hinge member coupled to the first edge via a first elastic axis member of the plurality of elastic axis members,
  a second rear hinge member coupled to the second edge via a second elastic axis member of the plurality of elastic axis members, and
  a third rear hinge member coupled between the first rear hinge member and the second rear hinge member,
  wherein the first rear hinge member comprises first inner connection protrusions with holes for receiving the first axis member and the first edge comprises first cover protrusions with holes for receiving the first elastic axis member, and
  wherein the second rear hinge member comprises second inner connection protrusions with holes for receiving the second axis member and the second edge comprises second cover protrusions with holes for receiving the second elastic axis member.

20. The method of claim 19, wherein bending of the hinge causes inserting of an inner portion protrusion of one of the rear hinge members into protrusion insertion space of another of the rear hinge members, the inner portion protrusion laterally extending from the one of the rear hinge members.

21. The method of claim 19, wherein unbending of the hinge causes retracting the inner portion protrusion of one of the rear hinge members from protrusion insertion space of another of the rear hinge members, the inner portion protrusion laterally extending from the one of the rear hinge members.

22. The method of claim 19, wherein bending of the hinge comprises bending of a bending member of a panel supporting frame between the flexible display panel and surfaces of the first rear cover, the second rear cover and the hinge.

* * * * *